US008199077B2

(12) United States Patent
Yamamoto et al.

(10) Patent No.: US 8,199,077 B2
(45) Date of Patent: Jun. 12, 2012

(54) DISPLAY APPARATUS, DRIVING METHOD FOR DISPLAY APPARATUS AND ELECTRONIC APPARATUS

(75) Inventors: Tetsuro Yamamoto, Kanagawa (JP); Katsuhide Uchino, Kanagawa (JP)

(73) Assignee: Sony Corporation, Tokyo (JP)

( * ) Notice: Subject to any disclaimer, the term of this patent is extended or adjusted under 35 U.S.C. 154(b) by 759 days.

(21) Appl. No.: 12/318,770

(22) Filed: Jan. 8, 2009

(65) Prior Publication Data

US 2009/0195480 A1 Aug. 6, 2009

(30) Foreign Application Priority Data

Feb. 4, 2008 (JP) ................................ 2008-024053

(51) Int. Cl.
*G09G 3/30* (2006.01)
*G09G 3/36* (2006.01)
*G09G 5/00* (2006.01)
*G06F 3/038* (2006.01)

(52) U.S. Cl. ............ 345/76; 345/204; 345/103; 345/98

(58) Field of Classification Search .................. 345/204, 345/211, 213, 76, 87, 90–100, 103
See application file for complete search history.

(56) References Cited

U.S. PATENT DOCUMENTS

| | | | | |
|---|---|---|---|---|
| 4,796,016 | A | 1/1989 | Clark | |
| 5,315,393 | A | 5/1994 | Mican | |
| 7,248,237 | B2 * | 7/2007 | Yamada et al. | 345/76 |
| 7,868,880 | B2 * | 1/2011 | Ozaki et al. | 345/204 |

FOREIGN PATENT DOCUMENTS

| | | | |
|---|---|---|---|
| EP | 1-785-979 | | 5/2007 |
| JP | 2003-255856 | A | 9/2003 |
| JP | 2003-271095 | A | 9/2003 |
| JP | 2004-029791 | A | 1/2004 |
| JP | 2004-093682 | A | 3/2004 |
| JP | 2004-133240 | A | 4/2004 |
| JP | 2006-251322 | | 9/2006 |
| JP | 2006-330140 | A | 12/2006 |
| JP | 2007-133284 | A | 5/2007 |

(Continued)

OTHER PUBLICATIONS

Japanese Office Action issued May 6, 2010 for corresponding Japanese Application No. 2008-024053.

(Continued)

*Primary Examiner* — Bipin Shalwala
*Assistant Examiner* — Ilana Spar
(74) *Attorney, Agent, or Firm* — Rader Fishman & Grauer, PLLC

(57) ABSTRACT

Disclosed herein is a display apparatus, including a pixel array section; and a driving section; the pixel array section including a plurality of scanning lines extending along the direction of a row, a plurality of signal lines extending along the direction of a column, a plurality of pixels disposed in rows and columns at places at which the scanning lines and the signal lines intersect with each other, and a plurality of feed lines disposed in parallel to the scanning lines, the driving section including a signal selector for supplying a driving signal having a signal potential to the signal lines, a write scanner for successively supplying a control signal to the scanning lines, and a drive scanner for supplying a power supply, which changes over between a high potential and a low potential, to the feed lines.

11 Claims, 20 Drawing Sheets

(5)

FOREIGN PATENT DOCUMENTS

| | | | |
|---|---|---|---|
| JP | 2007-148128 | | 6/2007 |
| JP | 2007-310311 | A | 11/2007 |
| WO | WO-03/030136 | A2 | 4/2003 |
| WO | WO-2005/029456 | A1 | 3/2005 |
| WO | WO-2006/116121 | A2 | 11/2006 |
| WO | WO-2006/126703 | A2 | 11/2006 |

OTHER PUBLICATIONS

Austrian Search Report dated Sep. 13, 2009 for corresponding SG Application No. 200900777-4.

European Search Report dated Apr. 8, 2009 for corresponding European Application No. 09250142.8-1228.

* cited by examiner (1)

(2), (3)

(4)

(5)

(5a)

(6)

(7)

DISPLAY APPARATUS, DRIVING METHOD FOR DISPLAY APPARATUS AND ELECTRONIC APPARATUS

CROSS REFERENCES TO RELATED APPLICATIONS

The present invention contains subject matter related to Japanese Patent Application JP 2008-024053 filed in the Japan Patent Office on Feb. 4, 2008, the entire contents of which being incorporated herein by reference.

BACKGROUND OF THE INVENTION

1. Field of the Invention

This invention relates to a display apparatus of the active matrix type wherein a light emitting element is used in a pixel and a driving method for a display apparatus of the type described. The present invention relates also to an electronic apparatus which includes a display apparatus of the type described.

2. Description of the Related Art

In recent years, development of a display apparatus of the planar self-luminous type which uses an organic EL (electroluminescence) device as a light emitting element is proceeding energetically. The organic EL device utilizes a phenomenon that, if an electric field is applied to an organic thin film, then the organic thin film emits light. Since the organic EL device is driven by an application voltage lower than 10 V, the power consumption of the same is low. Further, since the organic EL device is a self-luminous device which itself emits light, it desires no illuminating member and can be formed as a device of a reduced weight and a reduced thickness. Further, since the response speed of the organic EL device is approximately several μs and very high, an after-image upon display of a dynamic picture does not appear.

Among display apparatus of the flat self-luminous type wherein an organic EL device is used in a pixel, a display apparatus of the active matrix type wherein thin film transistors as active elements are formed in an integrated relationship in pixels is being developed energetically. A flat self-luminous display apparatus of the active matrix type is disclosed, for example, in Japanese Patent Laid-Open Nos. 2003-255856, 2003-271095, 2004-133240, 2004-029791, 2004-093682 and 2006-251322.

FIG. 23 schematically shows an example of an existing active matrix display apparatus. Referring to FIG. 23, the display apparatus shown includes a pixel array section 1 and a peripheral driving section. The driving section includes a horizontal selector 3 and a write scanner 4. The pixel array section 1 includes a plurality of signal lines SL extending along the direction of a column and a plurality of scanning lines WS extending along the direction of a row. A pixel 2 is disposed at a place at which each of the signal lines SL and each of the scanning lines WS intersect with each other. In order to facilitate understandings, merely one pixel 2 is shown in FIG. 23. The write scanner 4 includes a shift register which operates in response to a clock signal ck supplied thereto from the outside to successively transfer a start pulse sp supplied thereto similarly from the outside to output a sequential control signal to the scanning line WS. The horizontal selector 3 supplies an image signal to the signal line SL in synchronism with the line sequential scanning of the write scanner 4 side.

The pixel 2 includes a sampling transistor T1, a driving transistor T2, a storage capacitor C1 and a light emitting element EL. The driving transistor T2 is of the P-channel type, and is connected at the source thereof, which is one of current terminals, to a power supply line and at the drain thereof, which is the other current terminal, to the light emitting element EL. The driving transistor T2 is connected at the gate thereof, which is a control terminal thereof, to the signal line SL through the sampling transistor T1. The sampling transistor T1 is rendered conducting in response to a control signal supplied thereto from the write scanner 4 and samples and writes an image signal supplied from the signal line SL into the storage capacitor C1. The driving transistor T2 receives, at the gate thereof, the image signal written in the storage capacitor C1 as a gate voltage Vgs and supplies drain current Ids to the light emitting element EL. Consequently, the light emitting element EL emits light with luminance corresponding to the image signal. The gate voltage Vgs represents a potential at the gate with reference to the source.

The driving transistor T2 operates in a saturation region, and the relationship between the gate voltage Vgs and the drain current Ids is represented by the following characteristic expression $$Ids=(1/2)\mu(W/L)Cox(Vgs-Vth)^2$$

where μ is the mobility of the driving transistor, W the channel width of the driving transistor, L the channel length of the driving transistor, Cox the gate insulating layer capacitance per unit area of the driving transistor, and Vth is the threshold voltage of the driving transistor. As can be apparently seen from the characteristic expression, when the driving transistor T2 operates in a saturation region, it functions as a constant current source which supplies the drain current Ids in response to the gate voltage Vgs.

FIG. 24 illustrates a voltage/current characteristic of the light emitting element EL. In FIG. 24, the axis of abscissa indicates the anode voltage V and the axis of ordinate indicates the driving current Ids. It is to be noted that the anode voltage of the light emitting element EL is the drain voltage of the driving transistor T2. The current/voltage characteristic of the light emitting element EL varies with time such that the characteristic curve thereof tends to become less steep as time passes. Therefore, even if the driving current Ids is fixed, the anode voltage or drain voltage V varies. In this regard, since the driving transistor T2 in the pixel circuit 2 shown in FIG. 23 operates in a saturation region and can supply driving current Ids corresponding to the gate voltage Vgs irrespective of the variation of the drain voltage, the emission light luminance can be kept fixed irrespective of the time-dependent variation of the characteristic of the light emitting element EL.

FIG. 25 shows another example of an existing pixel circuit. Referring to FIG. 25, the pixel circuit shown is different from that described hereinabove with reference to FIG. 23 in that the driving transistor T2 is not of the P-channel type but of the N-channel type. From a fabrication process of a circuit, it is frequently advantageous to form all transistors which compose a pixel from N-channel transistors.

SUMMARY OF THE INVENTION

In the existing pixel circuits shown in FIGS. 23 and 25, the driving transistor T2 operates in a saturation region to control the driving current to be supplied to the light emitting element EL. However, a thin film transistor used as the driving transistor has a dispersion in threshold voltage Vth or mobility μ. As apparent from the transistor characteristic expression given hereinabove, if a dispersion exists in the threshold voltage Vth or the mobility μ, then the output current Ids disperses, and therefore, the uniformity of the screen image is damaged. Therefore, a configuration has commonly been proposed wherein a threshold voltage correction function or a mobility correction function of a driving transistor is incorporated in each pixel.

The pixel circuit shown in FIG. 23 or 25 is basically formed from two transistors, one capacitor and one light emitting element. Where a threshold voltage correction function or a mobility correction function is incorporated with such a comparatively simple circuit configuration as just described, it is necessary to scan the potential of the power supply in accordance with line-sequential scanning of scanning lines. Therefore, it is necessary for a peripheral driving section of the display apparatus to include a drive scanner for scanning power supply lines for individual rows of pixels in addition to a horizontal selector or signal selector for driving signal lines and a write scanner for scanning scanning lines.

All of the signal selector, write scanner and drive scanner are basically formed from a shift register and include a signal outputting section for each of stages of the shift register which correspond to individual columns or row of pixels. However, if the number of signal lines or scanning lines increases, then also the number of output stages of the shift register increases, resulting in increase in circuit scale of the peripheral driving section. The increase of the circuit scale of the peripheral driving section increases the circuit area of the peripheral driving section occupying on the panel and presses the area of a pixel array section which composes the screen as much.

A configuration is commonly known wherein an output stage of a shift register is commonly used for a plurality of signal lines or scanning lines in order to cope with the problem described above. For example, Japanese Patent Laid-Open No. 2006-251322 proposes a system wherein a signal line is commonly used for a plurality of pixels. By the system, an output stage of a shift register incorporated in a signal selector for driving signal lines can be used commonly by a plurality of pixel columns, and reduction in circuit scale, reduction in circuit area and reduction in circuit cost can be anticipated as much.

Naturally, although it is advantageous for reduction of the cost to reduce the number of signal lines, it is significant to achieve common use of an output stage of a shift register on the scanning line side in order to enhance the cost performance of the display apparatus. Particularly with regard to power supply lines or feed lines for supplying power to the pixels, the outputting sections or output buffers of the drive scanner have to be formed in a large device size in order to stabilize the current supplying power. Accordingly, where an output buffer of a drive scanner is provided corresponding to each row of pixels as in the existing apparatus, the occupation area of the drive scanner increases. This is a subject to be solved where it is intended to achieve reduction of the cost and the scale of the display panel.

Therefore, it is desirable to provide a display apparatus wherein reduction in size of a peripheral driving section can be achieved. To this end, according to the embodiments of the present invention, an output stage, that is, an output buffer, of a drive scanner for driving power supply lines or feed lines is used commonly for such power supply lines. More particularly, according to the embodiments of the present invention, there is provided a display apparatus including a pixel array section, and a driving section, the pixel array section including a plurality of scanning lines extending along the direction of a row, a plurality of signal lines extending along the direction of a column, a plurality of pixels disposed in rows and columns at places at which the scanning lines and the signal lines intersect with each other, and a plurality of feed lines disposed in parallel to the scanning lines, the driving section including a signal selector for supplying a driving signal having a signal potential to the signal lines, a write scanner for successively supplying a control signal to the scanning lines, and a drive scanner for supplying a power supply, which changes over between a high potential and a low potential, to the feed lines, each of the pixels including a sampling transistor connected at one of a pair of current terminals thereof to an associated one of the signal lines and at a control terminal thereof to an associated one of the scanning lines, a driving transistor connected at one of a pair of current terminals thereof, which serves as a drain side, to an associated one of the feed lines and at a control terminal thereof, which serves as a gate, to the other one of the current terminals of the sampling transistor, a light emitting element connected to that one of the current terminals of the driving transistor which serves as a source side, and a storage capacitor connected between the source and the gate of the driving transistor, the write scanner supplying the control signal to the scan lines while successively displacing the phase of the control signal, the drive scanner dividing the feed lines into groups of a predetermined number of feed lines such that the drive scanner carries out changeover between a high potential and a low potential while the phase is successively displaced in a unit of a group whereas the drive scanner changes over the potential of the feed lines in each of the groups in the same phase.

According to an embodiment of the present invention, the signal selector supplies the driving signal which alternately changes over at least between a reference potential and a signal potential, and the sampling transistor is turned on, when the associated signal line has the reference potential and the associated feed line has the low potential, in response to the control signal to carry out a preparation operation of setting the gate-source voltage of the driving transistor to a voltage higher than a threshold voltage of the driving transistor, and then is turned on, when the associated signal line has the reference potential and the associated feed line has the high potential, in response to the control signal to carry out a correction operation of discharging the storage capacitor so that the gate-source voltage of the driving transistor becomes equal to the threshold voltage, whereafter the sampling transistor is turned on, when the associated signal line has the signal potential and the associated feed line has the high potential, in response to the control signal to carry out a writing operation of storing the signal potential into the storage capacitor. In this instance, the signal selector may supply the driving signal, which varies among three levels including a storage potential lower than the reference potential in addition to the reference potential and the signal potential, to the signal lines, and the sampling transistor may apply the storage potential to the gate of the driving transistor at a final stage of the preparation operation to place the driving transistor once into an off state. Further, the sampling transistor may repeat the correction operation time-divisionally by a plural number of times and applies the storage potential in at least one of the correction operations to the gate of the driving transistor. According to a form of the embodiment, the preparation operation is carried out all at once for those of the pixels which are included in the rows which belong to one group, and the correction operation is carried out in a displaced relationship in a unit of a row. According to another form of the embodiment, the preparation operation and the correction operation are carried out successively in a displaced relationship in a unit of a row. According to another embodiment of the present invention, the sampling transistor is turned on, when the light emitting element is in a light emitting state with current supplied thereto from the driving transistor and the associated signal line has the reference potential, in response to the control signal to write the reference potential to the gate of the driving transistor to turn off the driving transistor thereby to change over the state of the light emitting element from the light emitting state to a no-light emitting state. In this instance, the light emitting element may be connected at the anode thereof to the source of the driving transistor and at the cathode thereof to a predetermined cathode potential, and the reference potential may be lower than the sum of the threshold voltage of the light emitting element and the threshold voltage of the driving transistor to the cathode potential.

In the display apparatus, the drive scanner divides the feed lines into groups of the predetermined number of feed lines such that the drive scanner carries out changeover between the high potential and the low potential while the phase is successively displaced in a unit of a group whereas the drive scanner changes over the potential of the feed lines in each of the groups in the same phase. By the configuration just described, the drive scanner can use each of the output stages thereof, that is, each of output buffers thereof commonly for the predetermined number of feed lines, that is, for each group. Consequently, the number of output buffers having a large device size can be reduced, and therefore, the circuit area of the driving section can be reduced. For example, where the feed lines are divided into groups of ten feed lines and each group is driven by one output buffer, the number of output stages is reduced to one tenth that of existing display apparatus. Where the circuit scale of the driving section is reduced, reduction in cost and enhancement in yield can be anticipated. The above and other aims, features and advantages of the embodiments of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

Figure 1:
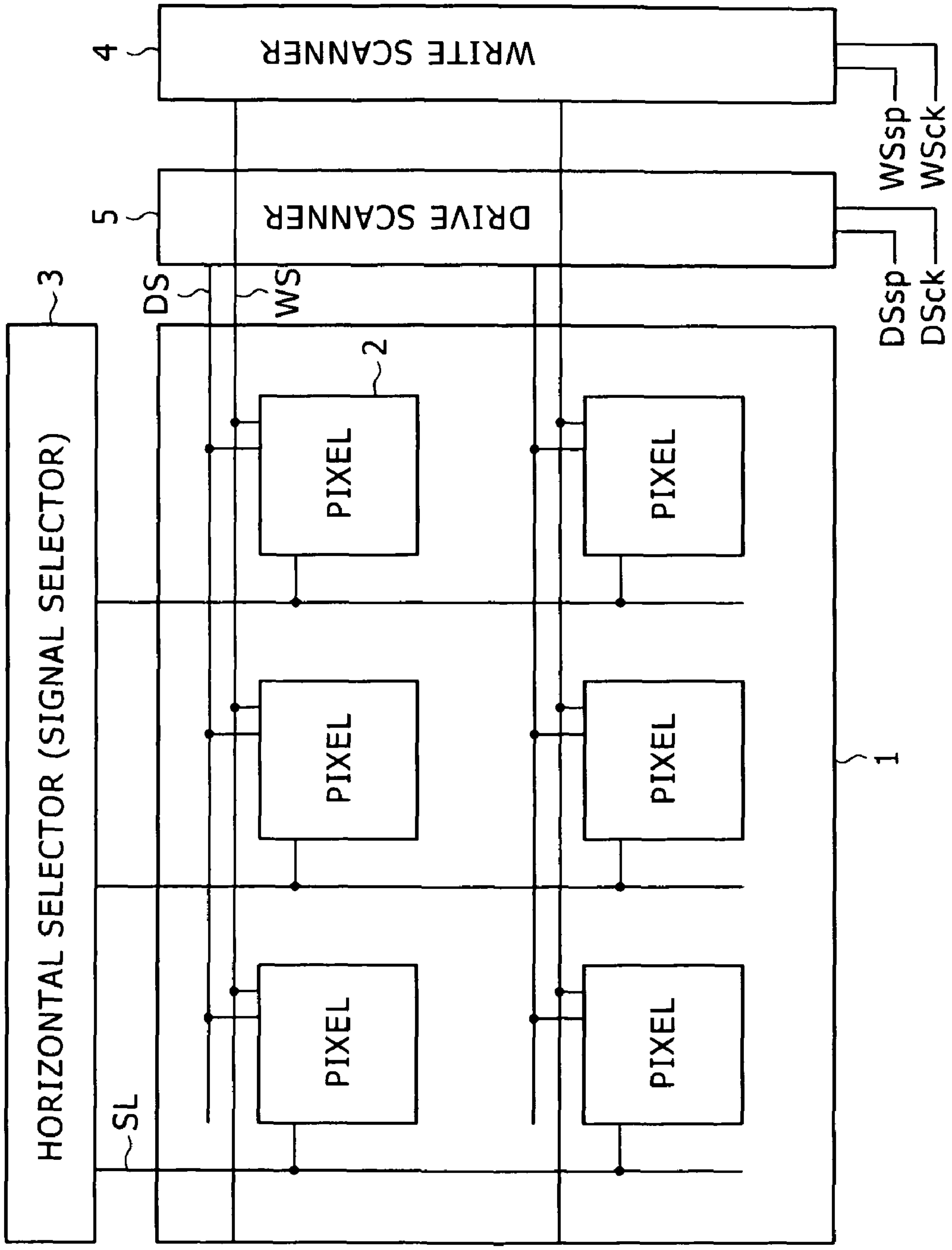
FIG. 1 is a block diagram showing a general configuration of a display apparatus according to a reference example

Referring first to FIG. 1, there is shown a general configuration of a display apparatus. It is to be noted, however, that the display apparatus of FIG. 1 has been developed formerly and a display apparatus according to the embodiments of the present invention is based on the display apparatus of FIG. 1. In order to make the background of the embodiments of the present invention clear and facilitate understandings, the reference example of FIG. 1 is described below as part of the description of the embodiments of the present invention. The display apparatus shown in FIG. 1 includes a pixel array section 1, and a driving section (3, 4 and 5) for driving the pixel array section 1. The pixel array section 1 includes a plurality of scanning lines WS extending along the direction of a row, a plurality of signal lines SL extending along the direction of a column, a plurality of pixels 2 disposed in rows and columns at places at which the scanning lines WS and the signal lines SL intersect with each other, and a plurality of feed lines DS serving as power supply lines disposed corresponding to the rows of the pixels 2. The driving section (3, 4 and 5) includes a controlling scanner or write scanner 4 for successively supplying a control signal to the scanning lines WS to line-sequentially scan the pixels 2 in a unit of a row, a power supply scanner or drive scanner 5 for supplying a power supply voltage which is changed over between a first potential and a second potential to each of the feed lines DS in response to the line-sequential scanning, and a signal selector or horizontal selector 3 for supplying a signal potential serving as an image signal and a reference potential to the signal lines SL in the columns in response to the line-sequential scanning. It is to be noted that the write scanner 4 operates in response to a clock signal WSck supplied thereto from the outside to successively transfer a start pulse WSsp supplied similarly from the outside to output a control signal to the scanning lines WS. The drive scanner 5 operates in response to a clock signal DSck supplied from the outside to successively transfer a start pulse DSsp supplied similarly from the outside to line-sequentially change over the potential of the feed lines DS.

Figure 2:
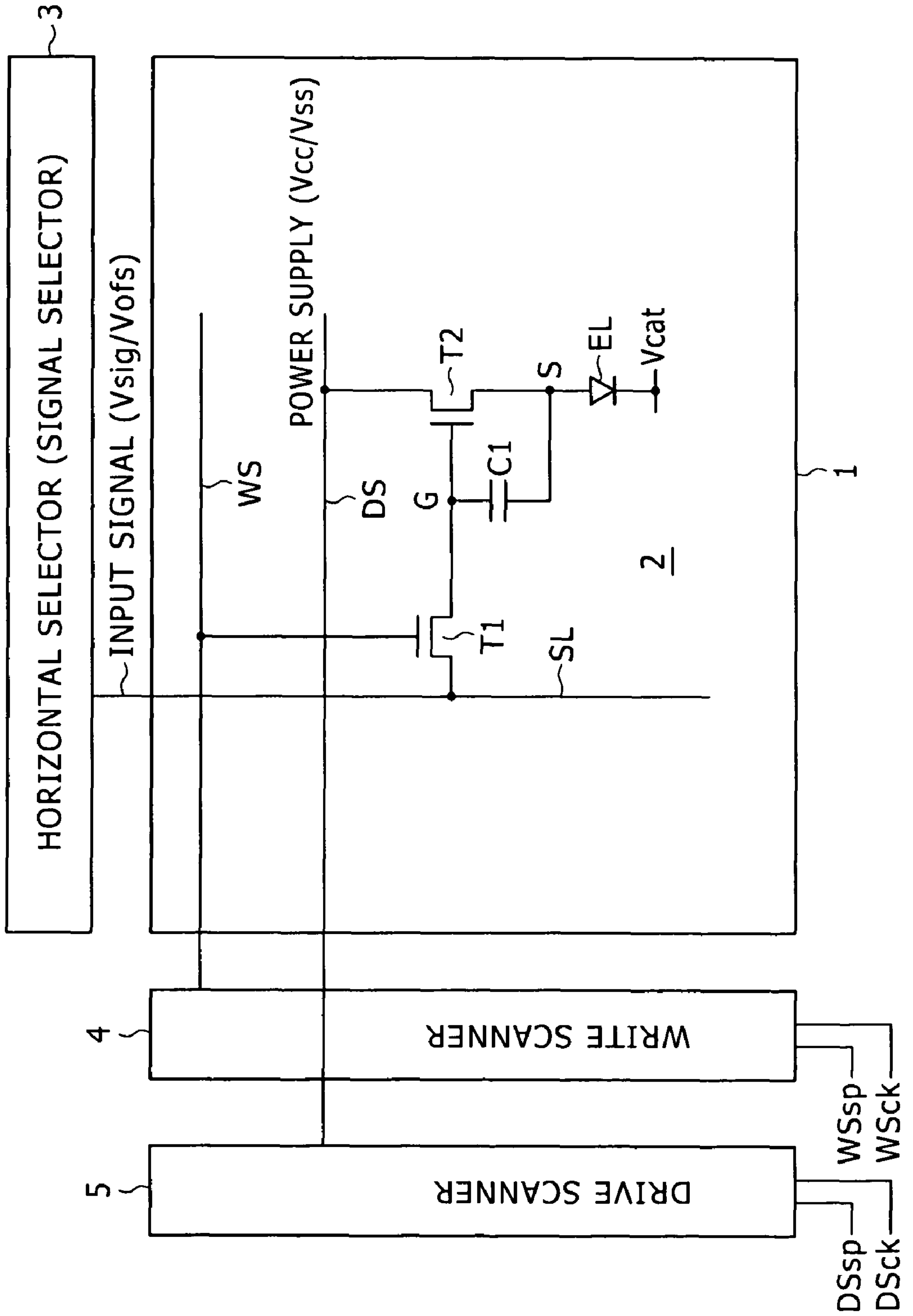
FIG. 2 is a circuit diagram showing an example of a pixel formed in the display apparatus shown in FIG. 1.

FIG. 2 shows a particular configuration of the pixels 2 included in the display apparatus shown in FIG. 1. Referring to FIG. 2, each pixel 2 includes a light emitting element EL of the two-terminal type or diode type represented by an organic EL device, a sampling transistor T1 of the N-channel type, a driving transistor T2 of the N-channel type, and a storage capacitor C1 of the thin film type. The sampling transistor T1 is connected at the gate thereof, which serves as a control terminal, to a scanning line WS, at one of the source and the drain thereof, which serve as current terminals, to a signal line SL and at the other one of the source and the drain thereof to the gate G of the driving transistor T2. The driving transistor T2 is connected at one of the source and the drain thereof to the light emitting element EL and at the other one of the source and the drain thereof to a feed line DS. In the present configuration, the driving transistor T2 is of the N-channel type and is connected at the drain side thereof, which is one of the current terminals, to the feed line DS and at the source S side thereof, which is the other current terminal, to the anode side of the light emitting element EL. The light emitting element EL is connected at the cathode thereof and fixed to a predetermined cathode potential Vcat. The storage capacitor C1 is connected between the source S as the current terminal and the gate G as the control terminal of the driving transistor T2. The controlling scanner or write scanner 4 changes over the potential to the scanning line WS between the low potential and the high potential to output a sequential control signal to the pixels 2 having such a configuration as described above thereby to line-sequentially scan the pixels 2 in a unit of a row. The power supply scanner or drive scanner 5 supplies a power supply voltage, which changes over between a first potential Vcc and a second potential Vss to the feed lines DS in response to the line-sequential scanning. The signal selector or horizontal selector 3 supplies a signal potential Vsig, which is an image signal, and a reference potential Vofs to the signal lines SL extending in the column direction in synchronism with the line-sequential scanning.

In the display apparatus having the configuration described above, the sampling transistor T1 samples and writes the signal potential Vsig into the storage capacitor C1 within a sampling period from a second timing at which the control signal rises after a first timing at which the image signal rises from the reference potential Vofs to the signal potential Vsig to a third timing at which the control signal falls to turn off the sampling transistor T1. Simultaneously, the current flowing through the driving transistor T2 is negatively fed back to the storage capacitor C1 to apply correction of the mobility μ of the driving transistor T2 to the signal potential written in the storage capacitor C1. In other words, the sampling period from the second timing to the third timing serves also as a mobility correction period within which the current flowing through the driving transistor T2 is negatively fed back to the storage capacitor C1.

The pixel circuit shown in FIG. 2 includes a threshold voltage correction function in addition to the mobility correction function described above. In particular, the power supply scanner or drive scanner 5 changes over the potential to the feed line DS from the first potential Vcc to the second potential Vss at the first timing before the sampling transistor T1 samples the signal potential Vsig. Similarly, before the sampling transistor T1 samples the signal potential Vsig, the controlling scanner or write scanner 4 renders the sampling transistor T1 conducting to apply the reference potential Vofs from the signal line SL to the gate G of the driving transistor T2 to set the source S of the driving transistor T2 to the second potential Vss. At the third timing after the second timing, the power supply scanner or drive scanner 5 changes over the potential to the feed line DS from the second potential Vss to the first potential Vcc to store a voltage corresponding to the threshold voltage Vth of the driving transistor T2 into the storage capacitor C1. By such threshold voltage correction function as just described, the present display apparatus can cancel the influence of the threshold voltage Vth of the driving transistor T2 which disperses for each pixel. It is to be noted that the order in time of the first timing and the second timing may be reversed.

The pixels 2 shown in FIG. 2 further includes a bootstrap function. In particular, the write scanner 4 places the sampling transistor T1 into a non-conducting state to electrically disconnect the gate G of the driving transistor T2 from the signal line SL at a point of time at which the signal potential Vsig is stored into the storage capacitor C1. Consequently, the gate potential of the driving transistor T2 varies in an interlocking relationship with the variation of the source potential of the driving transistor T2 to keep the gate-source voltage Vgs between the gate G and the source S of the driving transistor T2 fixed. Even if the current/voltage characteristic of the light emitting element EL varies as time passes, the gate-source voltage Vgs can be kept fixed, and no variation of the luminance occurs.

Figure 3:
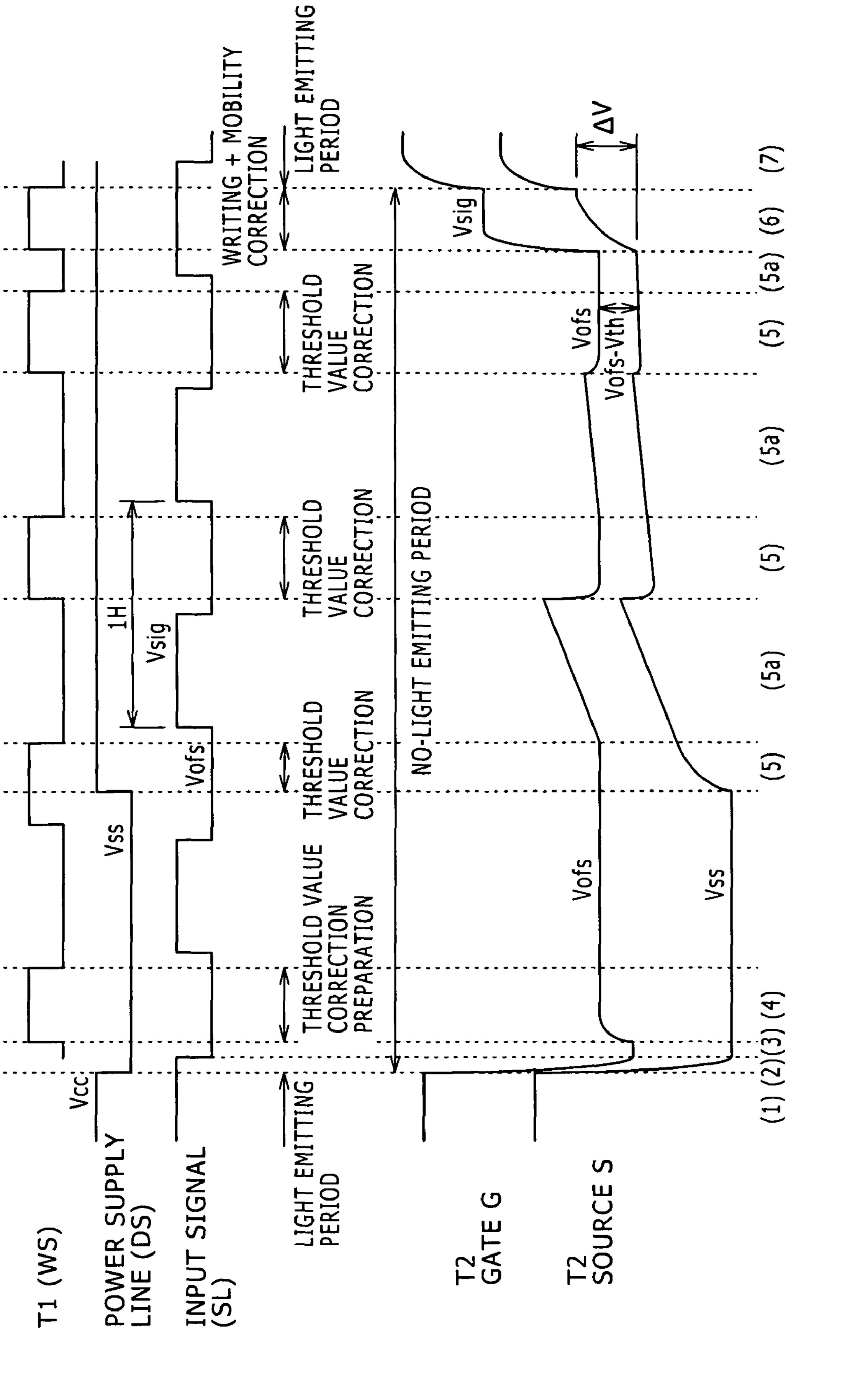
FIG. 3 is a timing chart illustrating a reference example of operation of the pixel shown in FIG. 2.

FIG. 3 illustrates operation of the pixel shown in FIG. 2. The timing chart of FIG. 3 illustrates the potential variation of the scanning line WS, the potential variation of the feed line or power supply line DS and the potential variation of the signal line SL with respect to the common time axis. The potential variation of the scanning line WS represents the control signal and controls the sampling transistor T1 between open and closed states. The potential variation of the feed line DS represents changeover between the power supply voltages Vcc and Vss. The potential variation of the signal line SL represents changeover between the signal potential Vsig and the reference potential Vofs of the input signal. In parallel to the potential variations mentioned, also the potential variations of the gate G and the source S of the driving transistor T2 are illustrated. The potential difference Vgs is the potential difference between the gate G and the source S as described hereinabove.

The period of the timing chart of FIG. 3 is divided into several periods (1) to (7) in accordance with the transition of the operation of the pixel for the convenience of description. Within the period (1) immediately prior to the pertaining field, the light emitting element EL is in a light emitting state. Thereafter, the new field of the line-sequential scanning is entered, and within the first period (2), the potential of the feed line DS is changed over from the first potential Vcc to the second potential Vss. Then, within the next period (3), the input signal is changed over from the signal potential Vsig to the reference potential Vofs. Further, within the period (4), the sampling transistor T1 is turned on. Within the periods (2) to (4), the gate voltage and the source voltage of the driving transistor T2 are initialized. The periods (2) to (4) are a preparation period for threshold voltage correction, within which the gate G of the driving transistor T2 is initialized to the reference potential Vofs and the source S of the driving transistor T2 is initialized to the second potential Vss. Then, within the threshold value correction period (5), a threshold voltage correction operation is carried out actually, and a voltage corresponding to the threshold voltage Vth is stored between the gate G and the source S of the driving transistor T2. Actually, the voltage corresponding to the threshold voltage Vth is written into the storage capacitor C1 connected between the gate G and the source S of the driving transistor T2.

It is to be noted that, in the reference example of FIG. 3, the threshold correction period (5) is provided three times to carry out the threshold voltage correction operation time-divisionally. A waiting period 5*a* is inserted between the threshold voltage correction periods (5). By dividing the threshold voltage correction period (5) to repeat the threshold voltage correction operation by a plural number of times, a voltage corresponding to the threshold voltage Vth is written into the storage capacitor C1. It is to be noted, however, that the embodiments of the present invention are not limited to this, but the correction operation may be carried out within one threshold voltage correction period (5).

Thereafter, the writing operation period/mobility correction period (6) is entered. Here, the signal potential Vsig of the image signal is written in an accumulated manner into the storage capacitor C1 while a voltage ΔV for mobility correction is subtracted from the voltage stored in the storage capacitor C1. Within the writing operation period/mobility correction period (6), it is necessary to place the sampling transistor T1 into a conducting state within a time zone within which the signal line SL remains having the signal potential Vsig. Thereafter, the light emitting period (7) is entered, and the light emitting element emits light with a luminance corresponding to the signal potential Vsig. Thereupon, since the signal potential Vsig is adjusted with the voltage corresponding to the threshold voltage Vth and the voltage ΔV for mobility correction, the emission light luminance of the light emitting element EL is not influenced by the dispersion of the threshold voltage Vth or the mobility μ of the driving transistor T2. It is to be noted that a bootstrap operation is carried out at the beginning of the light emitting period (7), and while the gate-source voltage Vgs of the driving transistor T2 is kept fixed, the gate potential and the source potential of the driving transistor T2 rise.

Figure 4:
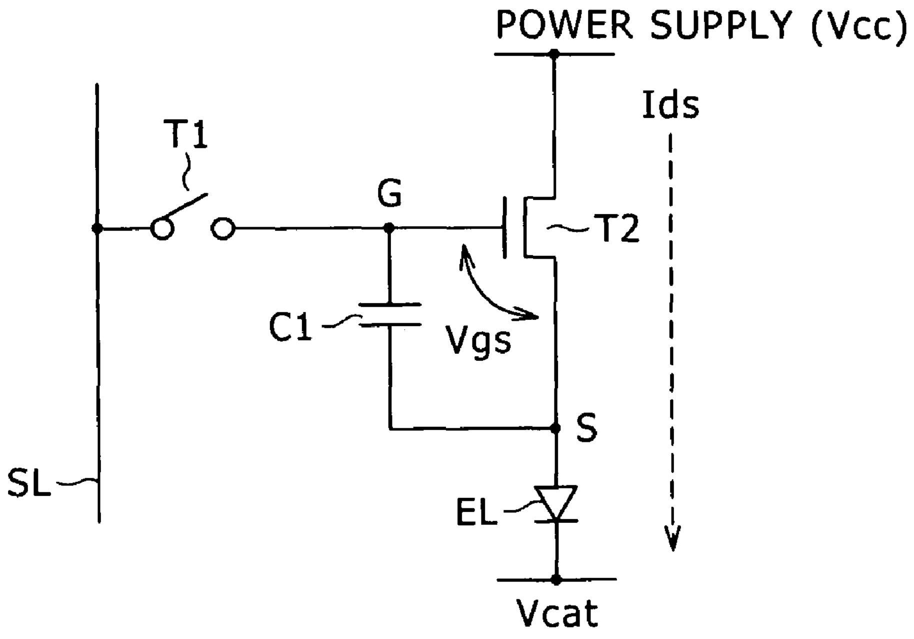
FIGS. 4, 5, 6 and 7 are circuit diagrams illustrating operations of the pixel shown in FIG. 2.

Operation of the pixel circuit shown in FIG. 2 is described in detail with reference to FIGS. 4 to 12. First, within the light emitting period (1), as seen in FIG. 4, the power supply potential is set to the first potential Vcc and the sampling transistor T1 is in an off state. At this times, since the driving transistor T2 is set so as to operate in a saturation region, the driving current Ids flowing through the light emitting element EL assumes a value given by the transistor characteristic expression mentioned hereinabove in response to the gate-source voltage Vgs applied between the gate G and the source S of the driving transistor T2.

Figure 5:
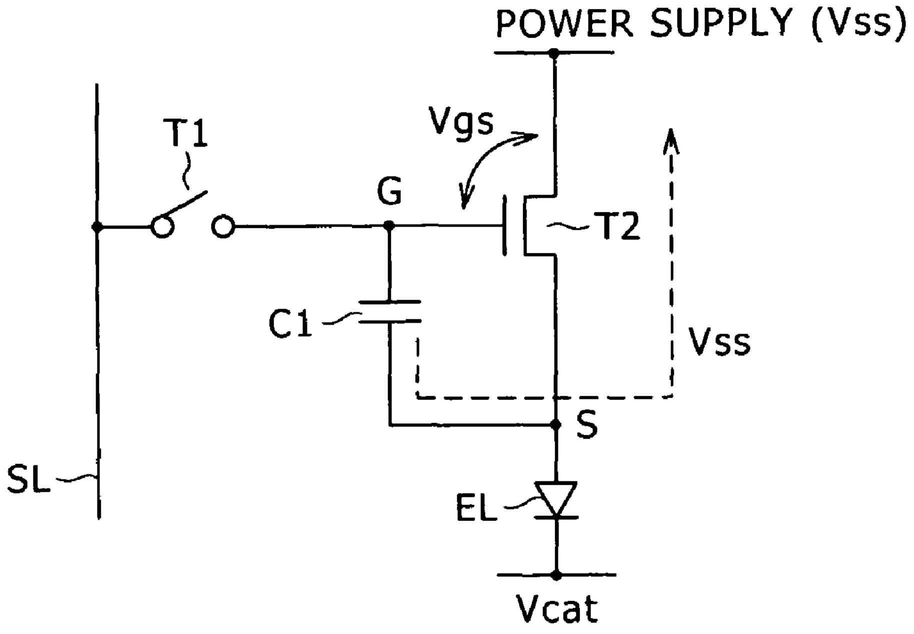

Then, after the preparation period (2) and (3) is entered, the potential of the feed line or power supply line is changed to the second potential Vss as seen in FIG. 5. At this time, the second potential Vss is set such that it is lower than the sum of the threshold voltage Vthel and the cathode voltage Vcat of the light emitting element EL. In other words, Vss □ Vthel+Vcat. Therefore, the light emitting element EL is turned off and the power supply line side becomes the source of the driving transistor T2. At this time, the anode of the light emitting element EL is charged to the second potential Vss.

Figure 6:
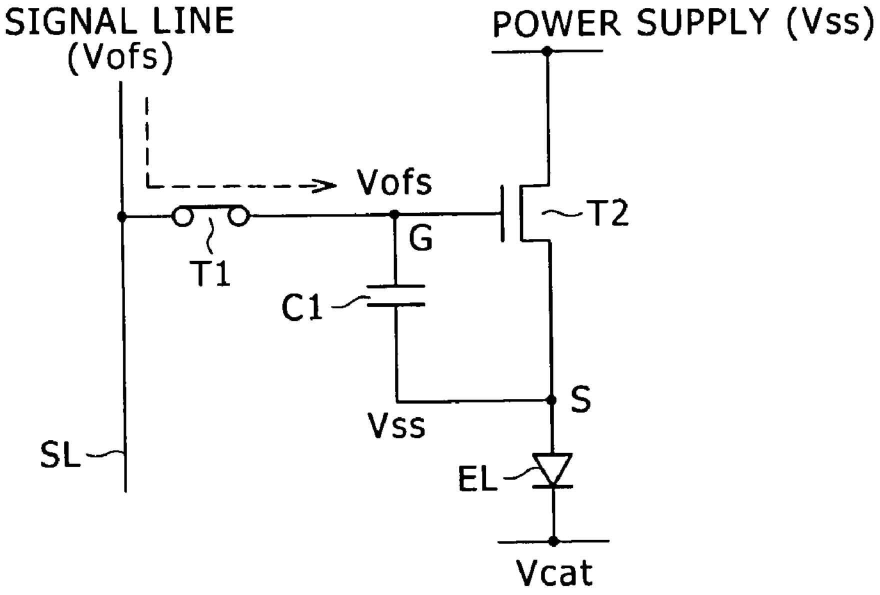

Then, after the next preparation period (4) is entered, while the potential of the signal line SL becomes the reference potential Vofs, the sampling transistor T1 is turned on to set the gate potential of the driving transistor T2 to the reference potential Vofs as seen in FIG. 6. The source S and the gate G of the driving transistor T2 upon light emission are initialized in this manner, and the gate-source voltage Vgs at this time becomes the value of Vofs−Vss. The gate-source voltage Vgs=Vofs−Vss is set so as to have a value higher than the threshold voltage Vth of the driving transistor T2. By initializing the driving transistor T2 such that Vgs □ Vth is satisfied in this manner, preparations for a succeeding threshold voltage correction operation are completed.

Figure 7:
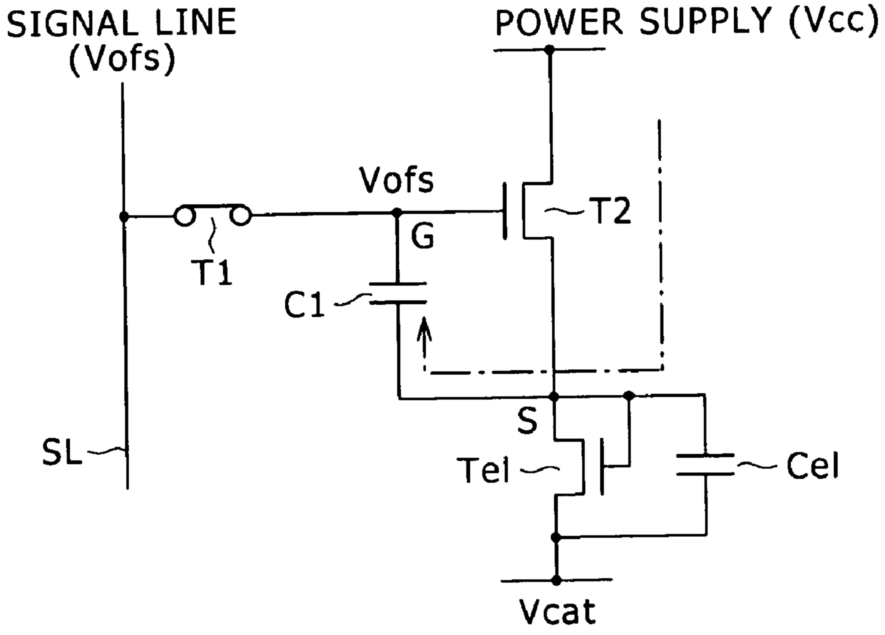

Then, after the threshold voltage correction period (5) is entered, the potential of the feed line or power supply line DS returns to the first potential Vcc as seen in FIG. 7. When the power supply voltage becomes the first potential Vcc, the potential of the anode of the light emitting element EL becomes the potential of the source S of the driving transistor T2, and current flows as seen in FIG. 7. At this time, the equivalent circuit of the light emitting element EL is represented by a parallel connection of a diode Tel and a capacitor Cel. Since the anode potential of the light emitting element EL, that is, the source potential Vss, is lower than Vcat+Vthel, the diode Tel is in an off state, and leak current flowing through the diode Tel is considerably smaller than the current flowing through the driving transistor T2. Therefore, almost all of the current flowing through the driving transistor T2 is used to charge up the storage capacitor C1 and the equivalent capacitor Cel.

Figure 8:
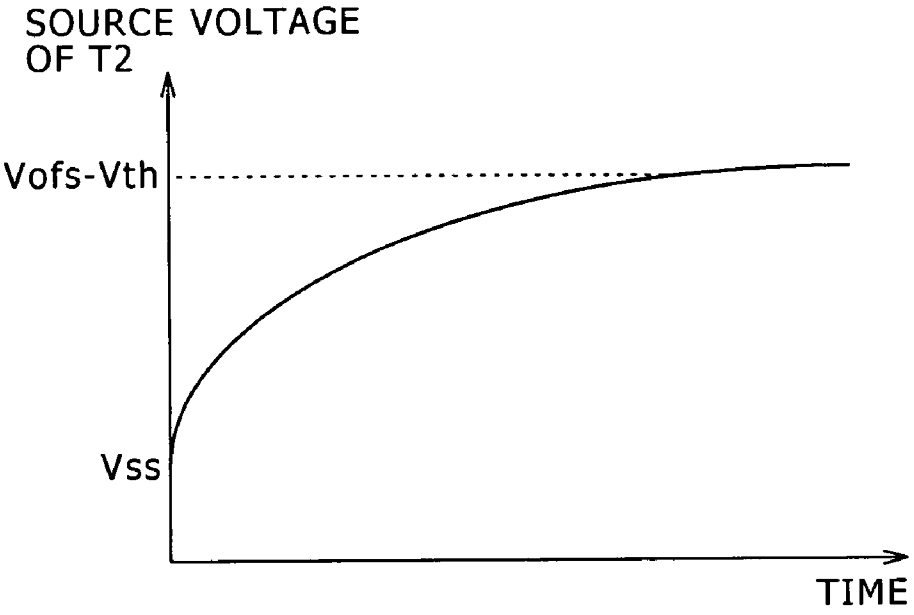
FIG. 8 is a graph illustrating the operation illustrated in FIG. 7.

FIG. 8 illustrates a time variation of the source potential of the driving transistor T2 within the threshold voltage correction period (5) illustrated in FIG. 7. Referring to FIG. 8, the source voltage of the driving transistor T2, that is, the anode voltage of the light emitting element EL, rises from the second potential Vss as time passes. After the threshold voltage correction period (5) passes, the driving transistor T2 is cut off, and the gate-source voltage Vgs between the source S and the gate G of the driving transistor T2 becomes equal to the threshold voltage Vth. At this time, the source potential is given by Vofs−Vth. If this value Vofs−Vth still remains lower than Vcat+Vthel, then the light emitting element EL is in a cutoff state.

Figure 9:
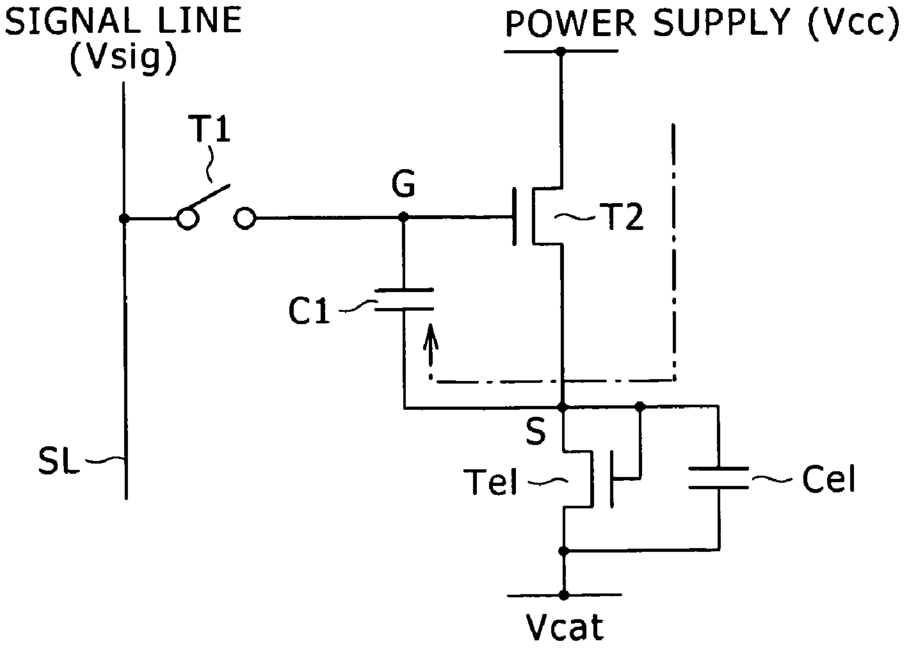
FIGS. 9 and 10 are circuit diagrams illustrating operations of the pixel shown in FIG. 2.

As seen from FIG. 8, the source potential of the driving transistor T2 rises as time passes. However, in the present example, before the source voltage of the driving transistor T2 reaches Vofs−Vth, the first time threshold voltage correction period (5) comes to an end, and therefore, the sampling transistor T1 is turned off and the waiting period (5*a*) is entered. FIG. 9 illustrates a state of the pixel circuit within this waiting period (5*a*). Within this first time waiting period (5*a*), since the gate-source voltage Vgs of the driving transistor T2 still remains higher than the threshold voltage Vth, current flows from the first potential Vcc to the storage capacitor C1 through the driving transistor T2 as seen in FIG. 9. Consequently, although the source voltage of the driving transistor T2 rises, since the sampling transistor T1 is in an off state and the gate G of the driving transistor T2 is in a high impedance state, also the potential of the gate G of the driving transistor T2 rises together with the potential rise of the source S. In other words, within the first-time waiting period (5*a*), both of the source potential and the gate potential of the driving transistor T2 rise. At this time, since the reverse bias continues to be applied to the light emitting element EL, the light emitting element EL emits no light.

Thereafter, when the time of 1 H passes and the potential of the signal line SL becomes the reference potential Vofs, the sampling transistor T1 is turned on to start the second time correction operation. Thereafter, when the second time threshold voltage correction period (5) elapses, the second time waiting period (5*a*) is entered. By repeating the threshold voltage correction period (5) and the waiting period (5*a*) in this manner, the gate-source voltage Vgs of the driving transistor T2 finally reaches a voltage corresponding to the threshold voltage Vth. At this time, the source potential of the driving transistor T2 is Vofs−Vth and is lower than Vcat+Vthel.

Figure 10:
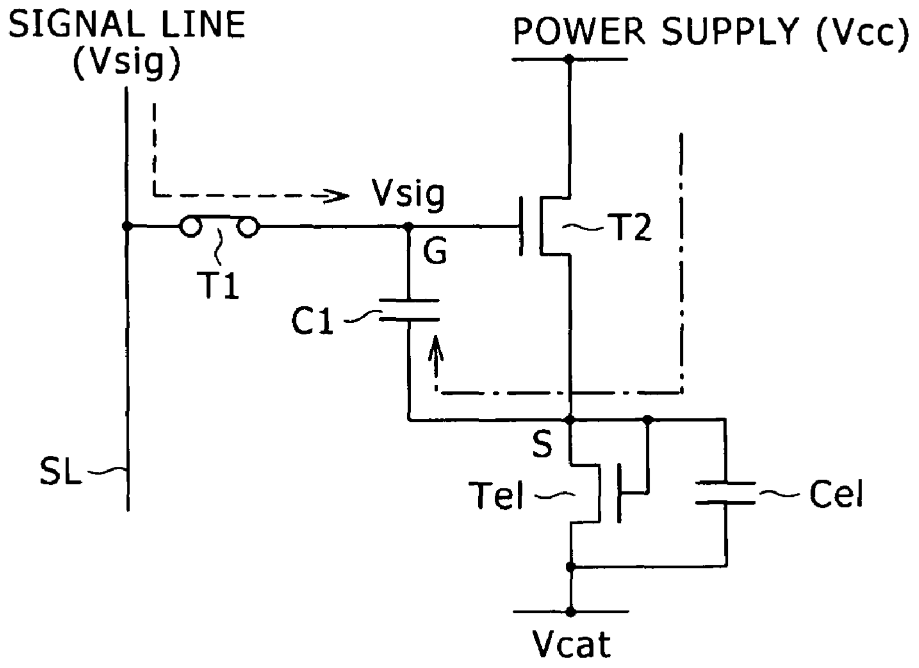

Thereafter, when the writing operation period/mobility correction period (6) is entered, the potential of the signal line SL is changed over from the reference potential Vofs to the signal potential Vsig and then the sampling transistor T1 is turned on as seen in FIG. 10. At this time, the signal potential Vsig has a voltage value according to a gradation. Since the sampling transistor T1 is on, the gate potential of the driving transistor T2 becomes the signal potential Vsig. Meanwhile, the source potential of the driving transistor T2 rises as time passes because current flows therethrough from the first potential Vcc. Also at this point of time, if the source potential of the driving transistor T2 does not exceed the sum of the threshold voltage Vthel of the light emitting element EL and the cathode voltage Vcat, then the current flowing from the driving transistor T2 is used merely for charging of the equivalent capacitor Cel and the storage capacitor C1. At this time, since the threshold voltage correction operation of the driving transistor T2 has been completed already, the current supplied from the driving transistor T2 reflects the mobility μ. Particularly, where the driving transistor T2 has a high mobility μ, the current amount at this time is great and also the potential rise amount ΔV of the source is great. On the contrary, where the driving transistor T2 has a low mobility μ, the current amount of the driving transistor T2 is small and the potential rise amount ΔV of the source is small. By such operation, the gate voltage Vgs of the driving transistor T2 is compressed by the potential rise amount ΔV reflecting the mobility μ, and at a point of time at which the mobility correction period (6) comes to an end, the gate-source voltage Vgs from which the mobility μ is eliminated completely is obtained.

Figure 11:
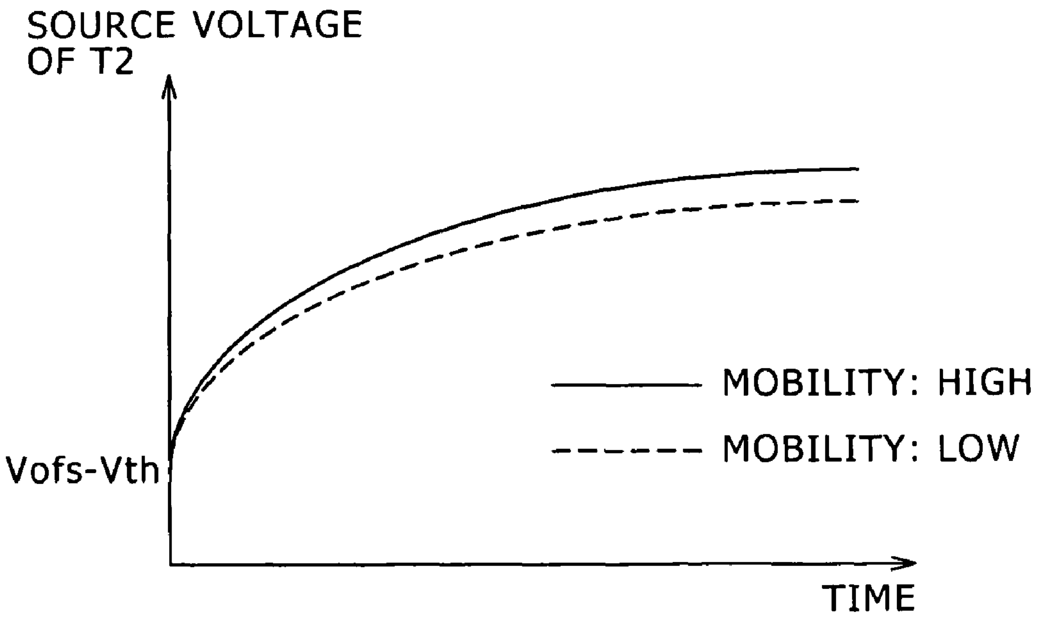
FIG. 11 is a graph illustrating the operation illustrated in FIG. 10.

FIG. 11 illustrates a variation with respect to time of the source potential of the driving transistor T2 within the mobility correction period (6) described above. As seen from FIG. 11, where the mobility of the driving transistor T2 is high, the source voltage of the driving transistor T2 rises quickly and the gate-source voltage Vgs is compressed as much. In other words, where the mobility μ is high, the gate-source voltage Vgs is compressed so as to cancel the influence of the mobility p, and the driving current can be suppressed. On the other hand, where the mobility μ is low, the source voltage of the driving transistor T2 does not rise very quickly, and also the gate-source voltage Vgs is not compressed very strongly. Accordingly, where the mobility μ is low, the gate-source voltage Vgs is not compressed very much so as to supplement the low driving capacity.

Figure 12:
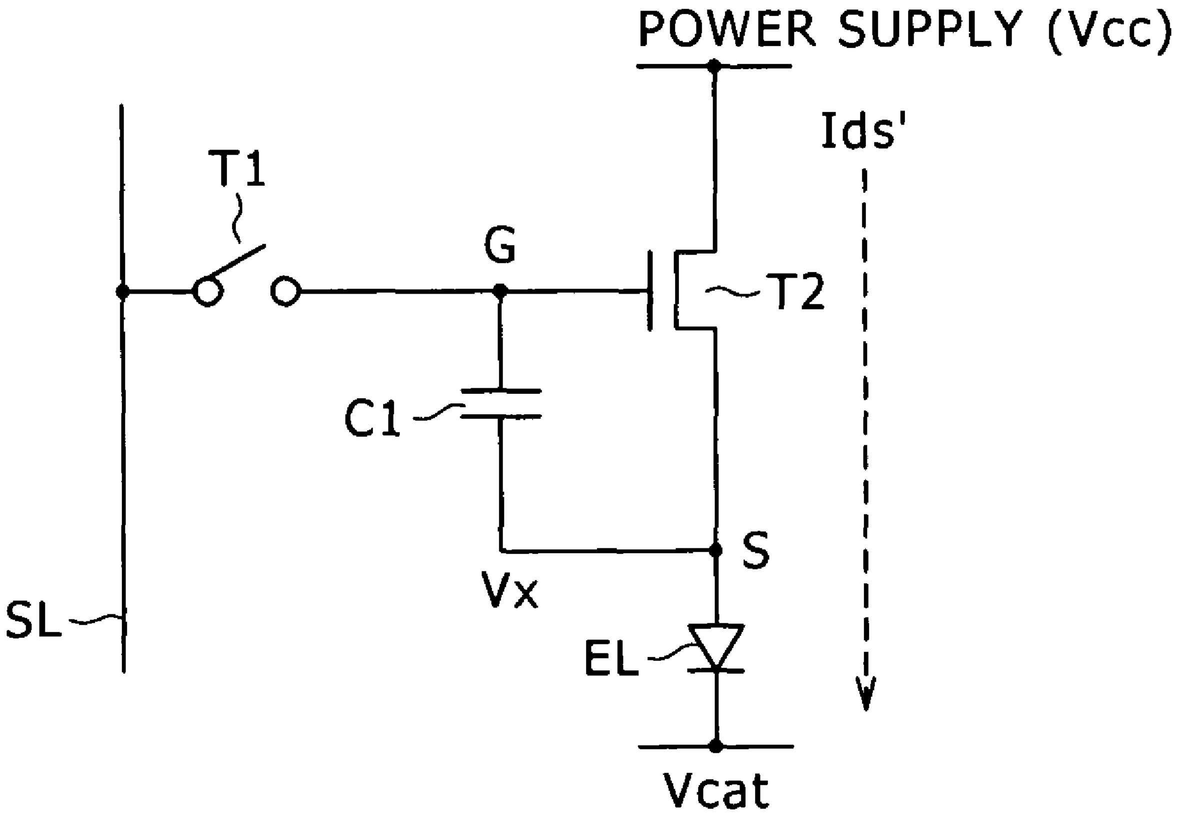
FIG. 12 is a circuit diagram illustrating an operation of the pixel shown in FIG. 2.

FIG. 12 illustrates an operation state within the light emitting period (7). Within the light emitting period (7), the sampling transistor T1 is turned off to cause the light emitting element EL to emit light. The gate voltage Vgs of the driving transistor T2 is kept fixed, and the driving transistor T2 supplies fixed driving current Ids' in accordance with the characteristic expression given hereinabove to the light emitting element EL. Since the driving current Ids' flows through the light emitting element EL, the anode voltage of the light emitting element EL, that is, the source voltage of the driving transistor T2, rises up to Vx, and at a point of time at which the voltage exceeds Vcat+Vthel, the light emitting element EL emits light. As the light emission time becomes long, the current/voltage of the light emitting element EL varies. However, since the gate-source voltage Vgs of the driving transistor T2 is kept at a fixed value by the bootstrap operation, the driving current Ids' flowing through the light emitting element EL does not vary. Therefore, even if the current/voltage characteristic of the light emitting element EL deteriorates, the fixed driving current Ids' typically flows, and the luminance of the light emitting element EL does not vary at all.

In the display apparatus according to the reference example described above with reference to FIG. 1, the drive scanner 5 drives the feed lines DS line by line. Accordingly, the drive scanner 5 includes a number of output buffers equal to the number of the feed lines DS. Different from the write scanner 4, the drive scanner 5 supplies driving current to the feed lines DS, and therefore, the output buffers thereof have a large device size. Consequently, the drive scanner 5 has a large size, and it is necessary to take a countermeasure for reducing the size.

Figure 13:
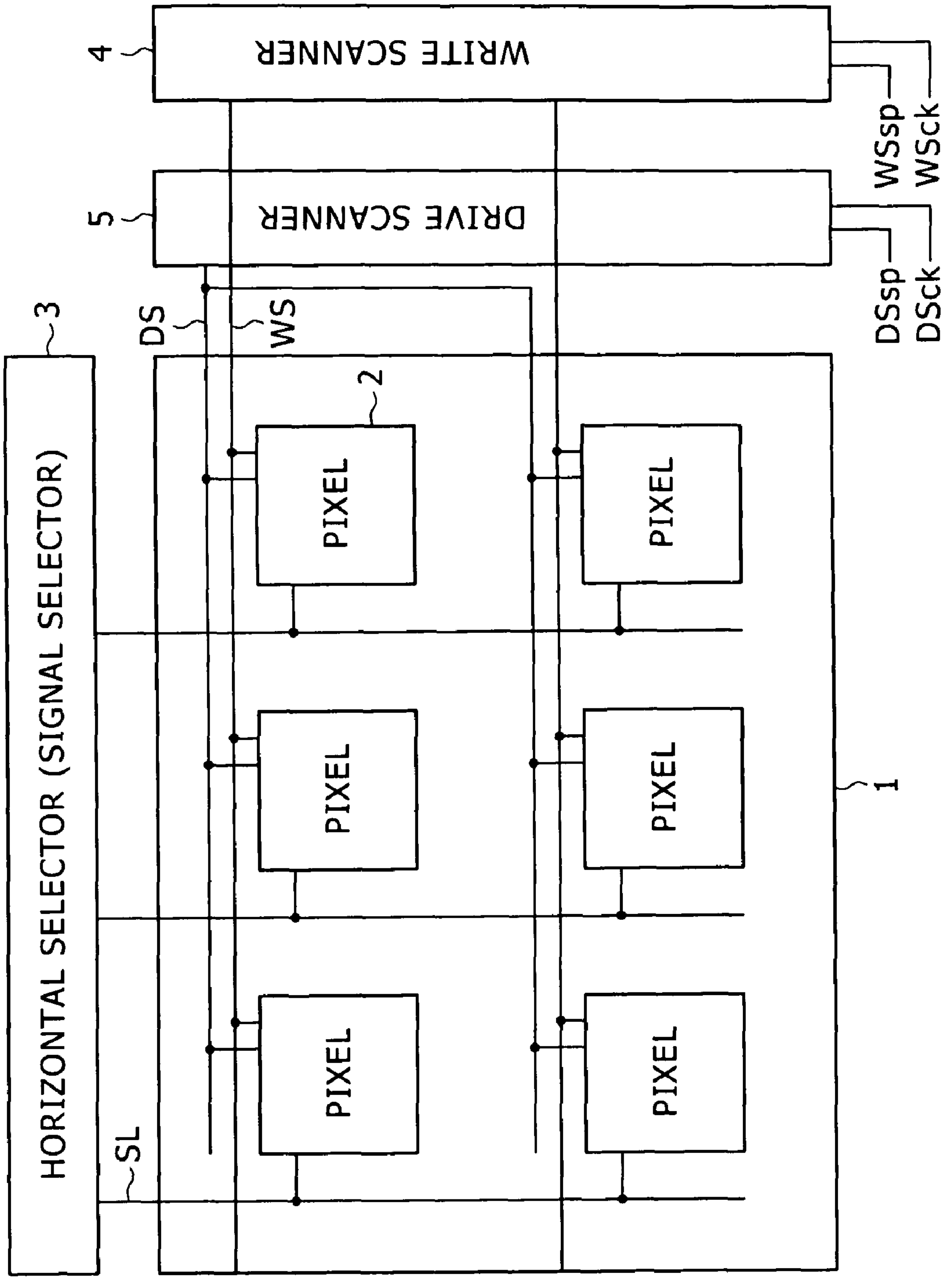
FIG. 13 is a block diagram showing a general configuration of a display apparatus to which the embodiments of the present invention are applied.

FIG. 13 shows a display apparatus which solves the problem described above of the display apparatus according to the reference example described above with reference to FIG. 1. Referring to FIG. 13, the display apparatus shown basically includes a pixel array section 1 and a driving section. The pixel array section 1 includes a plurality of scanning lines WS extending along the direction of a row, a plurality of signal lines SL extending along the direction of a column, a plurality of pixels 2 disposed in rows and columns at places at which the scanning lines WS and the signal lines SL intersect with each other, and a plurality of feed lines DS extending in parallel to the scanning lines WS. Meanwhile, the driving section includes a horizontal selector or signal selector 3 for supplying a driving signal or image signal having a signal potential to the signal lines SL in the columns, a write scanner 4 for successively supplying a control signal to the scanning lines WS in the rows, and a drive scanner 5 for supplying a power supply which is changed over between a high potential and a low potential to the feed lines DS.

The pixel 2 has a configuration same as that of the reference example described hereinabove with reference to FIG. 2. In particular, each pixel 2 includes a sampling transistor T1 connected at one of current terminals thereof to a signal line SL and at the control terminal thereof to a scanning line WS, a driving transistor T2 connected at one of the current terminals thereof, which serves as the drain side, to a feed line DS and at the control terminal thereof, which serves as the gate G, to the other current terminal of the sampling transistor T1, a light emitting element EL connected to the current terminal of the driving transistor T2, which serves as the source S side, and a storage capacitor C1 connected between the soured S and the gate G of the driving transistor T2. It is to be noted that the light emitting element EL is connected at the anode thereof to the source S of the driving transistor T2 and at the cathode thereof to a predetermined cathode potential Vcat.

As a characteristic matter of the embodiments of the present invention, the drive scanner 5 divides the feed lines DS in the rows into groups of a predetermined number of feed lines and carries out changeover between a high potential and a low potential successively displacing the phase in a unit of a group while changing over, in each group, the potential of a predetermined number of ones of the feed lines DS in the same phase. In the example shown in FIG. 13, the drive scanner 5 divides the feed lines DS in the rows into groups of two feed lines DS and carries out changeover between a high potential and a low potential successively displacing the phase in a unit of a group while changing over, in each group, the potential of the two feed lines DS in the same phase. In this manner, in the embodiments of the present invention, common timings are used for a plurality of feed lines or power supply lines DS of different rows or different stages.

The drive scanner 5 is basically formed from a shift register and output buffers connected to individual stages of the shift register. The shift register operates in response to a clock signal DSck supplied thereto from the outside and successively transfers a start signal DSsp supplied thereto from the outside similarly to output a control signal, which is to be used for power supply changeover, for each stage. Each of the output buffers changes over an associated power supply line between a high potential and a low potential in response to the control signal. In the embodiments of the present invention, common control timings are used for a plurality of power supply lines so that an output buffer is used commonly by the plural power supply lines. Consequently, the number of output buffers can be reduced. Since the output buffers supply power to the feed lines DS, they have to have a high current driving capacity and therefore have a large size. By reducing the number of output buffers having such a large size as just described, reduction in circuit size and in cost and achievement in high yield of a peripheral driving section can be anticipated. If one output buffer is used commonly, for example, to two feed lines DS as in the example of FIG. 13, then the total number of output buffers can be reduced to one half. Further, if a common control timing is used for ten feed lines DS, then the number of output buffers can be reduced to one tenth that of the reference example described hereinabove with reference to FIG. 1.

Figure 14:
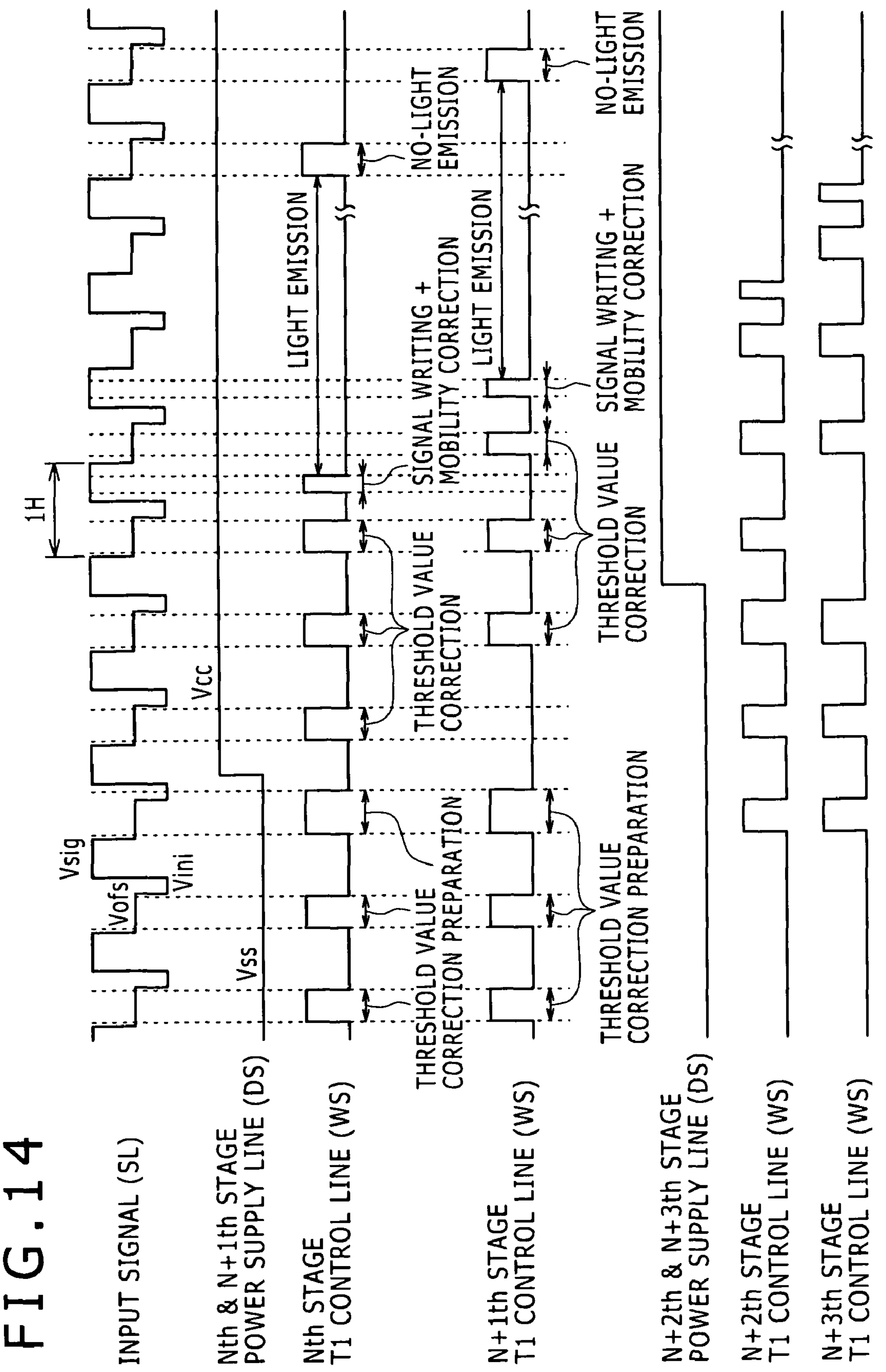
FIG. 14 is a timing chart illustrating operation of the display apparatus of FIG. 13.

FIG. 14 illustrates operation of the display apparatus described hereinabove with reference to FIG. 13. A driving signal is inputted to each signal line SL. As seen from FIG. 14, the input driving signal assumes three levels of a threshold value correction reference potential Vofs, a signal potential Vsig and a storage potential Vini within one horizontal period (1H). The storage potential Vini is lower than the reference potential Vofs.

To each feed line or power supply line DS, a power supply which changes over between the low potential Vss and the high potential Vcc is supplied. In the timing chart of FIG. 14, a power supply is supplied at a common timing and phase to two power supply lines of the Nth stage and the N+1th stage.

To the scanning line or T1 control line WS of the Nth stage or Nth row, a control signal pulse supplied to the sampling transistor T1 at the Nth stage or Nth row is outputted. Similarly, to the scanning line or T1 control line WS at the N+1th stage, the control signal applied to the sampling transistor T1 of the N+1th stage is outputted.

In this manner, in the present embodiment, two power supply lines group together and a common control timing is applied to the power supply lines of the group. In the timing chart of FIG. 14, a control timing is indicated not merely of the group of the power supply lines at the Nth stage and the N+1th stage but also of the next group including the power supply lines of the N+2th stage and the N+3th stage. As can be seen apparently from FIG. 14, the scanning timing or phase of the power supply lines at the N+2th and N+3th stages is shifted by two horizontal periods (2H) from that of the power supply lines at the Nth and N+1th stages.

First, within a no-light emitting period, when the signal line SL has the reference potential Vofs, the sampling transistors T1 at the Nth and N+1th stages are turned on. At this time, the reference potential Vofs is charged into the gate G of the driving transistor T2 while the low potential Vss is charged into the source S of the driving transistor T2. In particular, a threshold value correction preparation operation of setting the gate G of the driving transistor T2 to the reference potential Vofs and setting the source S of the driving transistor T2 to the low potential Vss is carried out. As seen in FIG. 14, the threshold value correction preparation operation is carried out repetitively by three times each for 1H. Within the last or third-time threshold value correction preparation period, the storage potential Vini is written into the source S of the driving transistor T2 at a point of time at which the potential of the signal line SL changes over from the reference potential Vofs to the storage potential Vini. By this operation, at a point of time at which the threshold value correction preparation operation is completed, the gate-source voltage Vgs of the driving transistor T2 changes from Vofs−Vss to Vini−Vss. Here, the level of the storage potential Vini is set such that, while Vofs−Vss is higher than the threshold voltage of the driving transistor T2, Vini−Vss has a value lower than the threshold voltage Vth of the driving transistor T2. After the storage potential Vini is charged into the gate G of the driving transistor T2, the sampling transistor T1 is turned off to end the threshold value correction preparation period. In the timing chart of FIG. 14, while the threshold value correction preparation operation is repeated three times, the storage potential Vini is written into the gate G of the driving transistor T2 merely within the last or third-time threshold value correction preparation period. It is to be noted, however, that the storage potential Vini is inputted to the gate G of the driving transistor T2 otherwise in all of the threshold value correction preparation operation repeated by a plural number of times.

After the sampling transistor T1 is turned off, the potential of the feed line DS or power supply line is changed from the low potential Vss to the high potential Vcc. At this time, if it is assumed that the gate-source voltage Vgs of the driving transistor T2 is higher than the threshold voltage Vth, then current flows through the driving transistor T2 and the gate potential, whereupon the source potential of the driving transistor T2 vary. There is the possibility that the threshold voltage correction operation may be dispersed among the different stages by an influence of the variation of the gate potential or the source potential of the driving transistor T2. In order to cope with this, according to the embodiments of the present invention, the storage potential Vini is written in advance at a stage at which the threshold value correction operation is completed. Consequently, the gate-source voltage Vgs (=Vini−Vss) of the driving transistor T2 is lower than the threshold voltage Vth, and therefore, the driving transistor T2 is in an off state and the gate potential and the source potential of the driving transistor T2 little vary. Therefore, the threshold voltage correction operation can be carried out normally.

After the potential of the feed line or power supply line changes over from the low potential Vss to the high potential Vcc, when the scanning line WS has the reference potential Vofs, the sampling transistor T1 is turned on to carry out the threshold voltage correction operation. In the example illustrated in FIG. 14, the threshold voltage correction operation is carried out repetitively three times for each 1H. In the present embodiment, in order to carry out the threshold voltage correction operation, when the scanning line WS has the threshold value correction reference potential Vofs, the sampling transistor T1 is controlled between on and off. However, the sampling transistor T1 may otherwise be turned off after the potential of the scanning line WS changes over to the storage potential Vini. Since this makes the gate-source voltage Vgs of the driving transistor T2 lower than the threshold voltage Vth of the driving transistor T2, no wasteful current flows through the driving transistor T2 within a period after the sampling transistor T1 is turned off until the sampling transistor T1 is turned on subsequently.

After the time-divisional threshold voltage correction operation by three times ends in this manner, when the potential of the scanning line WS now becomes the signal potential Vsig, the sampling transistor T1 is turned on again to carry out signal writing. By this operation, also mobility correction of the driving transistor T2 is carried out simultaneously. After the predetermined mobility correction time elapses, the sampling transistor T1 is turned off to end the writing and cause the light emitting element EL to emit light. A light emitting period is started in this manner.

At a point of time at which the light emitting period ends, when the potential of the signal line SL is the threshold value correction reference potential Vofs, the sampling transistor T1 is turned on to turn off the light emitting element EL. In the present embodiment, when the potential of the signal line SL is the reference potential Vofs, the sampling transistor T1 is turned on to sample the reference potential Vofs to turn off the light emitting element EL. However, the storage potential Vini may otherwise be sampled to turn off the driving transistor T2 to turn off the light emitting element EL. As occasion demands, a potential different from the reference potential Vofs or the storage potential Vini may be written into the gate of the driving transistor T2 to carry out a turning off operation of the light emitting element EL. The potential necessary to turn off the light emitting element EL should be lower than the sum Vcat+Vthel+Vth of the cathode potential Vcat, the threshold voltage Vthel of the light emitting element EL and the threshold voltage Vth of the driving transistor T2.

In the reference example described hereinabove, the potential of the feed line or power supply line DS is changed over for each row or stage to change over the light emitting element between the on and off states. In contrast, in the embodiments of the present invention, since a feed line DS is used commonly by a plurality of pixel rows, the changeover between the on and off states may not be carried out row-sequentially. Therefore, in the embodiments of the present invention, the reference potential Vofs or the storage potential Vini supplied from the scanning line WS is sampled to turn off the driving transistor T2 thereby to carry out changeover between the light emitting state and the no-light emitting state row-sequentially.

Figure 15A:
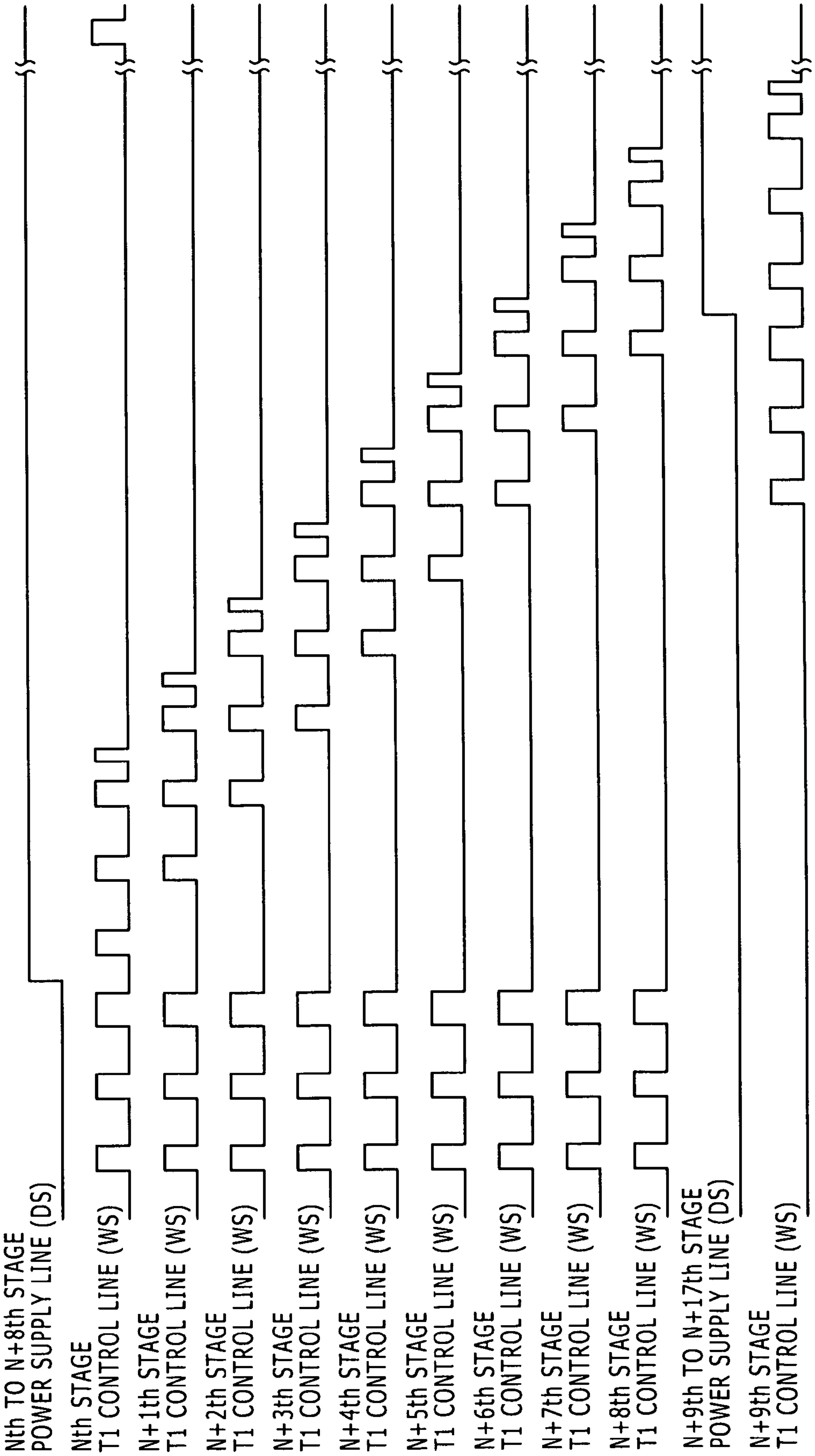
FIGS. 15A, 15B and 15C are timing charts illustrating different operations of the display apparatus of FIG. 13.

FIG. 15A is a timing chart illustrating an example of development of the timing chart illustrated in FIG. 14. Referring to FIG. 15A, in the example illustrated, the feed lines DS or power supply lines are divided into groups of nine feed lines DS, and change over between the high potential and the low potential is carried out successively displacing the phase in a unit of a group while the potential of the nine feed line DS in each group is changed over in the same phase. In other words, common timings are used for power supply lines of each nine stages. By this, the number of output buffers to be incorporated in the drive scanner can be reduced down to one ninth that of the reference example.

As can be recognized apparently from the foregoing description, in the display apparatus according to the embodiments of the present invention, the signal selector 3 supplies a driving signal which alternately changes over at least between the reference potential Vofs and the signal potential Vsig to the signal lines SL. When the potential of a signal line SL is the reference potential Vofs and the potential of the feed line DS is the low potential Vss, the sampling transistor T1 is turned on in response to the control signal to carry out a preparation operation of setting the gate-source voltage Vgs of the driving transistor T2 to a voltage higher than the threshold voltage Vth of the driving transistor T2. Then, when the potential of the signal line SL is the reference potential Vofs and the potential of the feed line DS is the high potential Vcc, the sampling transistor T1 is turned on in response to the control signal to carry out a correction operation of discharging the storage capacitor Cs so that the gate-source voltage of the driving transistor T2 becomes the threshold voltage Vth of the driving transistor T2. Thereafter, when the potential of the signal line SL is the signal potential Vsig and the potential of the feed line DS is the high potential Vcc, the sampling transistor T1 is turned on in response to the control signal to carry out a writing operation of storing the signal potential Vsig into the storage capacitor Cs.

Preferably, the signal selector 3 supplies a driving signal, which varies among three levels of the reference potential Vofs, signal potential Vsig and storage potential Vini, which is lower than the reference potential Vofs, to the signal line SL. In this instance, the sampling transistor T1 applies the storage potential Vini to the gate G of the driving transistor T2 at a final stage of the threshold voltage correction preparation operation to place the driving transistor T2 into an off state once. Consequently, the succeeding threshold voltage correction operation can be carried out normally. The driving transistor T2 may repeat the threshold voltage correction operation time-divisionally by a plural number of times such that the storage potential Vini is applied to the gate G of the driving transistor T2 after at least one of the correction operations. This prevents useless current from flowing between different ones of the threshold voltage correction operations. Preferably, the threshold voltage correction preparation operation is carried out all at once for the pixels of those rows which belong to one group whereas the threshold voltage correction operation is carried out successively in a displaced relationship in a unit of a row. When the light emitting element EL is in an on state while current is supplied from the driving transistor T2 and the signal line SL has the reference potential Vofs, the sampling transistor T1 is turned on in response to the control signal to write the reference potential Vofs into the gate G of the driving transistor T2 to turn off the driving transistor T2 thereby to change over the state of the light emitting element EL from an on state to an off state. The light emitting element EL is connected at the anode thereof to the source S of the driving transistor T2 and at the cathode thereof to the predetermined cathode potential Vcat. The reference potential Vofs is lower than the potential of the sum of the threshold voltage Vthel of the light emitting element EL and the threshold voltage Vth of the driving transistor T2 to the cathode potential Vcat.

Figure 15B:
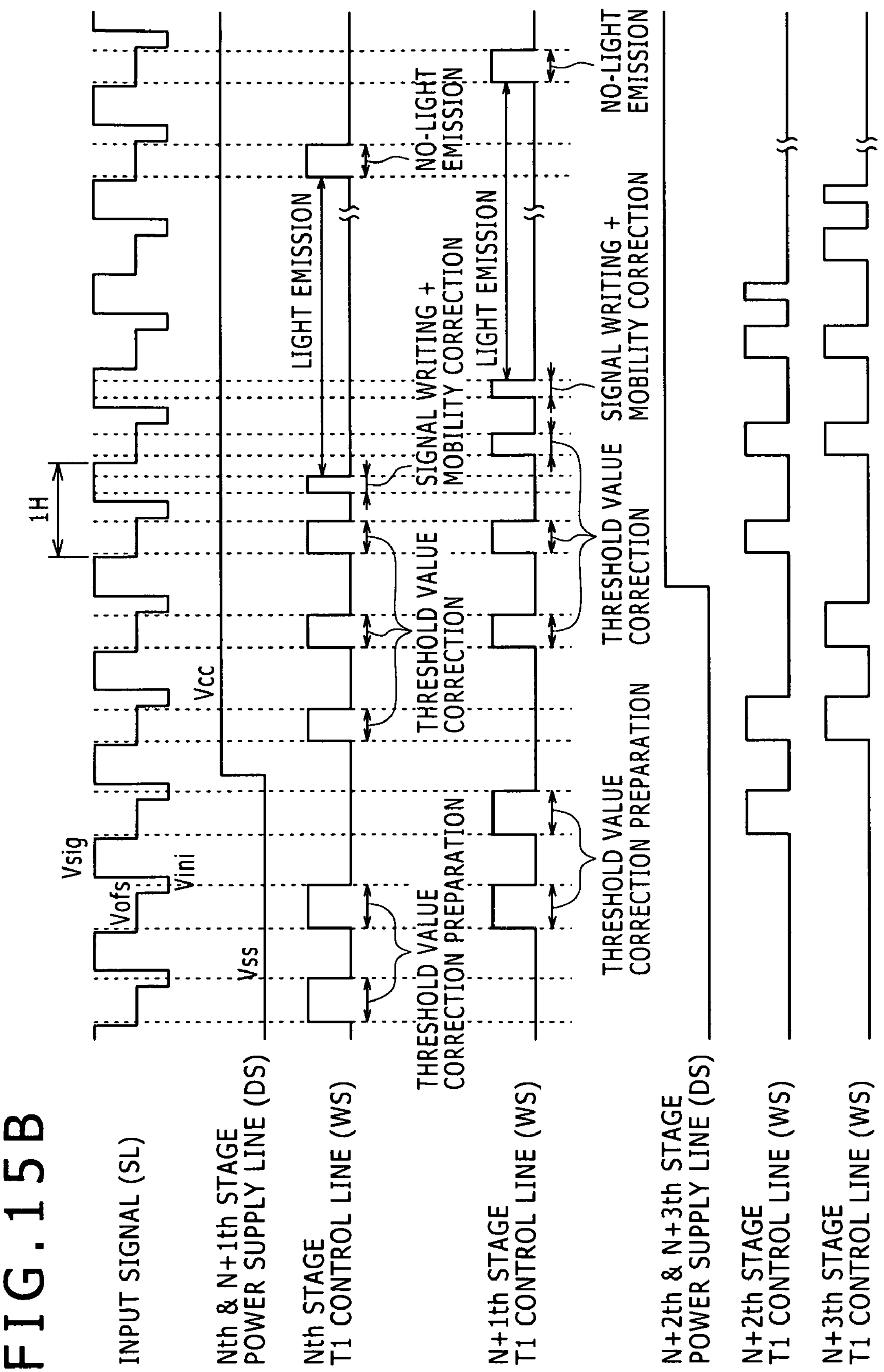

FIG. 15B is a timing chart illustrating another driving method of the display apparatus according to the embodiments of the present invention. In order to facilitate understandings, FIG. 15B adopts a representation manner similar to that of the timing chart of FIG. 14. In the driving method described hereinabove with reference to FIG. 14, the threshold voltage correction preparation operation is carried out all at once for the pixels of two rows which belong to one group, and the threshold voltage correction operation is carried out successively in a displaced relationship in a unit of a row. In contrast, in the driving method illustrated in FIG. 15B, the preparation operation and the threshold voltage correction operation are successively carried out in a displaced relationship in a unit of a row. By this method, the control signal to be applied to the sampling transistor T1 in the Nth stage and the control signal to be applied to the sampling transistor T1 in the N+1th stage which belong to the same group can have a common waveform. As seen in FIG. 15B, the waveforms of the T1 control line at the Nth stage and the N+1th stage are same although the phases thereof have a shift of 1H therebetween. By this, the configuration of the write scanner can be simplified. A write scanner of a configuration quite similar to that of the write scanner of the reference example can be used as it is. By successively transferring the waveform of a start pulse supplied to the write scanner from the outside, it is possible to produce the control signals to be supplied to the individual scanning lines WS. It is to be noted that, also in the driving method of FIG. 15B, the threshold value correction preparation operation is carried out repetitively by a plural number of times. Then, it is necessary to sample the storage potential Vini from the signal line SL and write the sampled storage potential Vini into the gate G of the driving transistor T2 by the last threshold value correction preparation operation. By this, the gate-source voltage Vgs of the driving transistor T2 can be kept suppressed lower than the threshold voltage Vth.

Figure 15C:
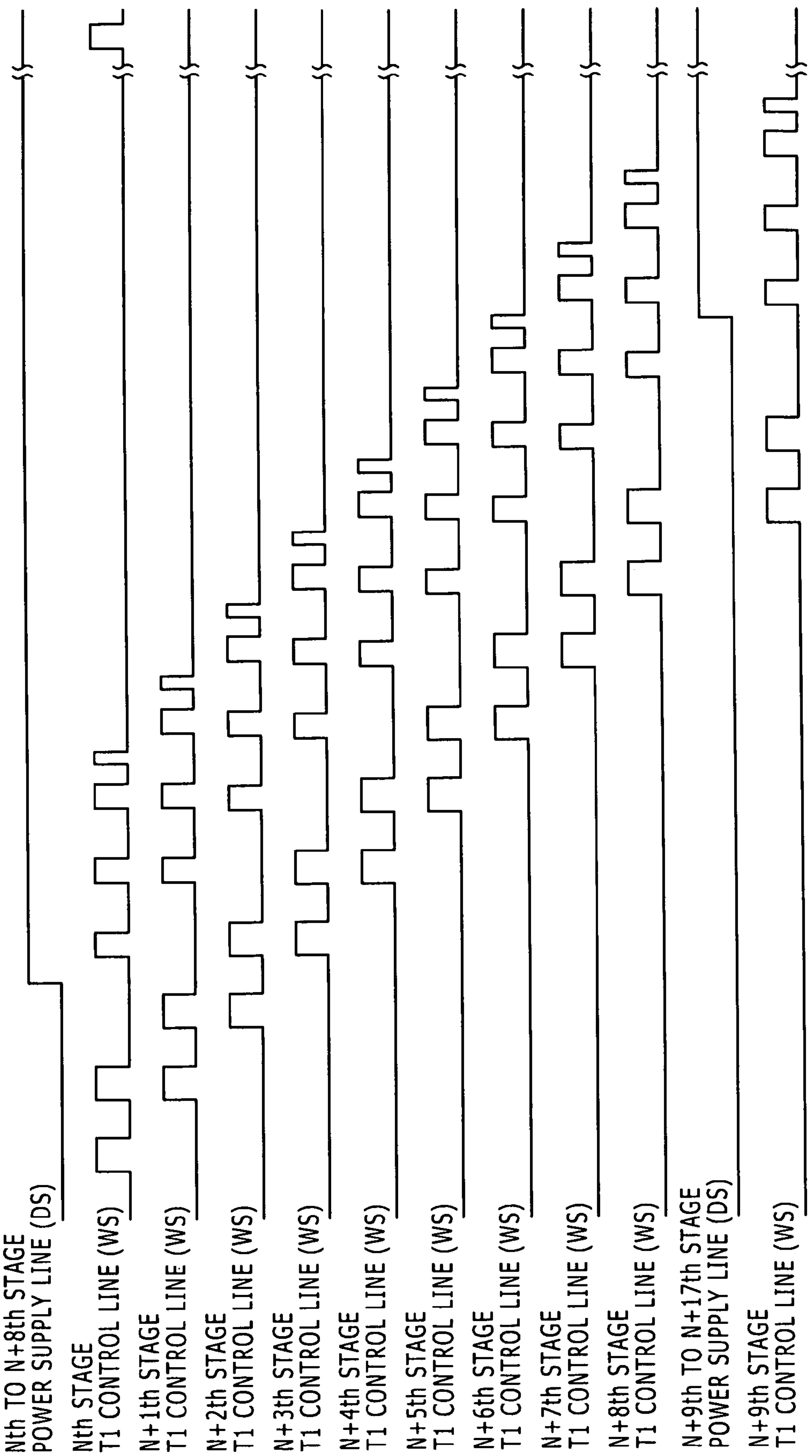

FIG. 15C illustrates an example of development of the timing chart illustrated in FIG. 15B. Referring to FIG. 15C, in the example illustrated, the feed lines or power supply lines DS are divided into groups of nine feed lines DS, and changeover between the high potential and the low potential is carried out successively displacing the phase in a unit of a group while the potentials of the nine feed lines DS in the group are changed over in the same phase. In other words, common timings are used for power supply lines at the nine stages. By this, the number of output buffers to be incorporated in the drive scanner can be reduced to one ninth that of the reference example.

Figure 16:
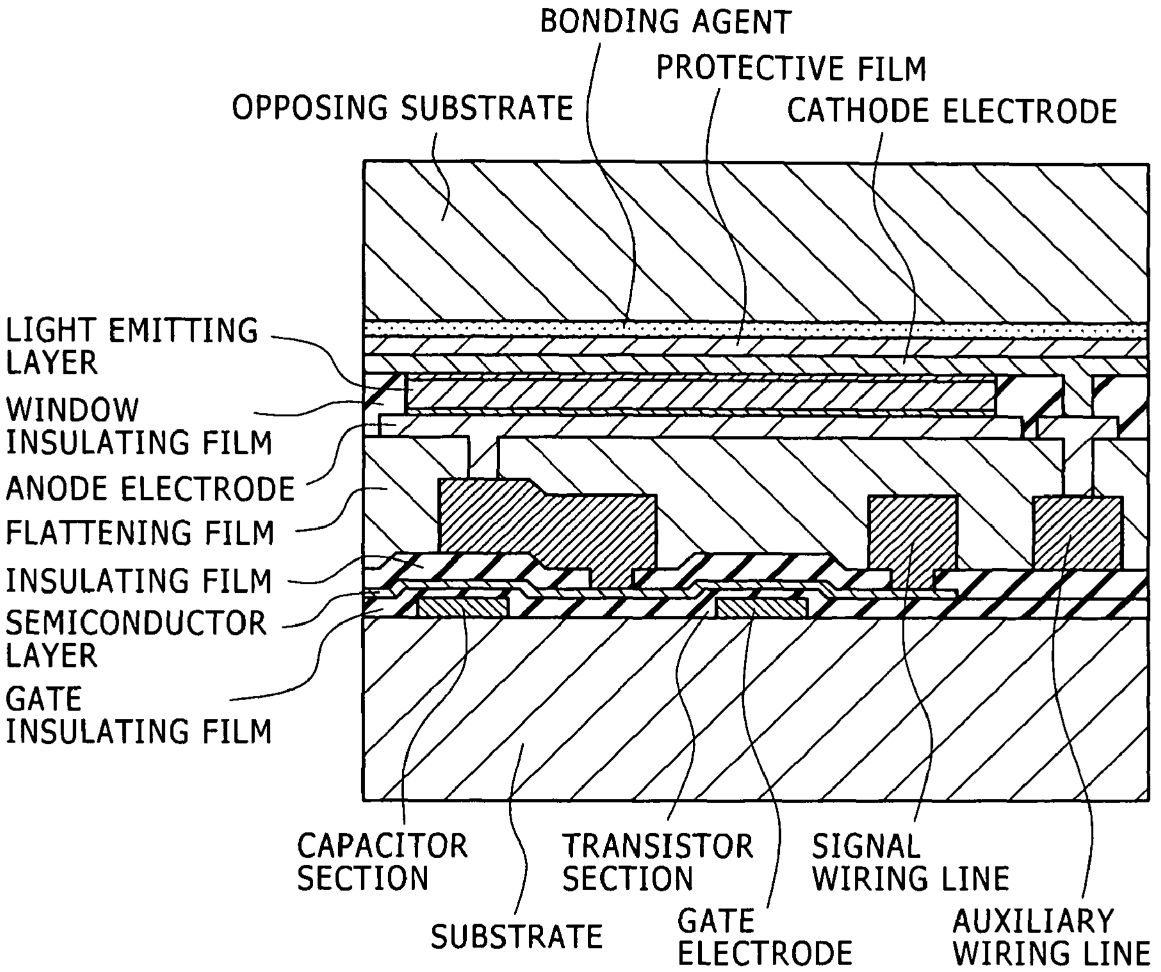
FIG. 16 is a sectional view showing a configuration of the display apparatus of FIG. 13.

The display apparatus according to the embodiments of the present invention has such a thin film device configuration as shown in FIG. 16. FIG. 16 shows a schematic sectional structure of a pixel formed on an insulating substrate. As seen in FIG. 16, the pixel shown includes a transistor section (in FIG. 16, one TFT is illustrated) including a plurality of thin film transistors, a capacitor section such as a storage capacitor or the like, and a light emitting section such as an organic EL element. The transistor section and the capacitor section are formed on the substrate by a TFT process, and the light emitting section such as an organic EL element is laminated on the transistor section and the capacitor section. A transparent opposing substrate is adhered to the light emitting section by a bonding agent to form a flat panel.

Figure 17:
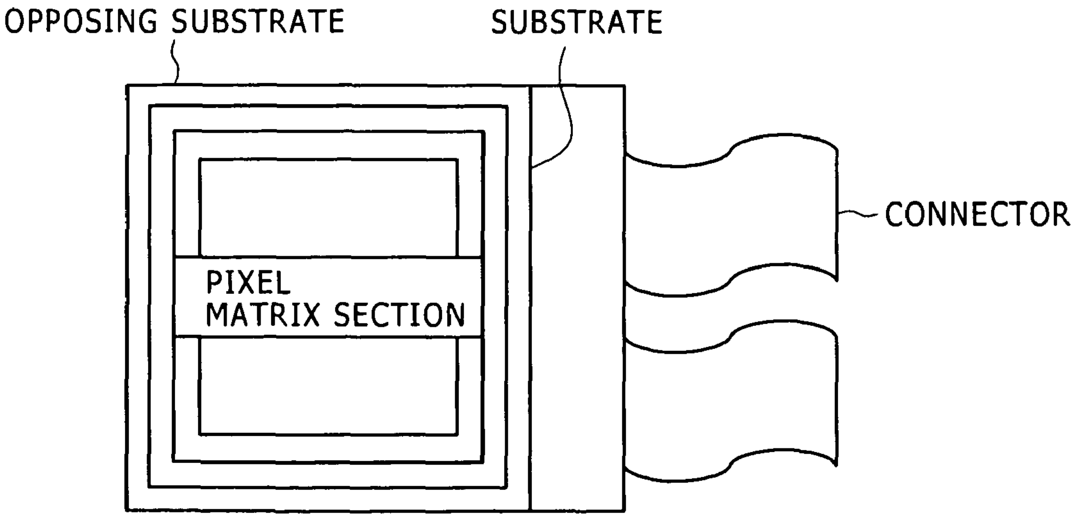
FIG. 17 is a plan view showing a module configuration of the display apparatus of FIG. 13.

The display apparatus of the present embodiment includes such a display apparatus of a module type of a flat shape as seen in FIG. 17. Referring to FIG. 17, a display array section wherein a plurality of pixels each including an organic EL element, a thin film transistor, a thin film capacitor and so forth are formed and integrated in a matrix, for example, on an insulating substrate. A bonding agent is disposed in such a manner as to surround the pixel array section or pixel matrix section, and an opposing substrate of glass or the like is adhered to form a display module. As occasion demands, a color filter, a protective film, a light intercepting film and so forth may be provided on this transparent opposing substrate. As a connector for inputting and outputting signals and so forth from the outside to the pixel array section and vice versa, for example, a flexible printed circuit (FPC) may be provided on the display module.

The display apparatus according to the embodiments of the present invention described above has a form of a flat panel and can be applied as a display apparatus of various electric apparatus in various fields wherein an image signal inputted to or produced in the electronic apparatus is displayed as an image, such as, for example, digital cameras, notebook type personal computers, portable telephone sets and video cameras. In the following, examples of the electronic apparatus to which the display apparatus is applied are described.

Figure 18:
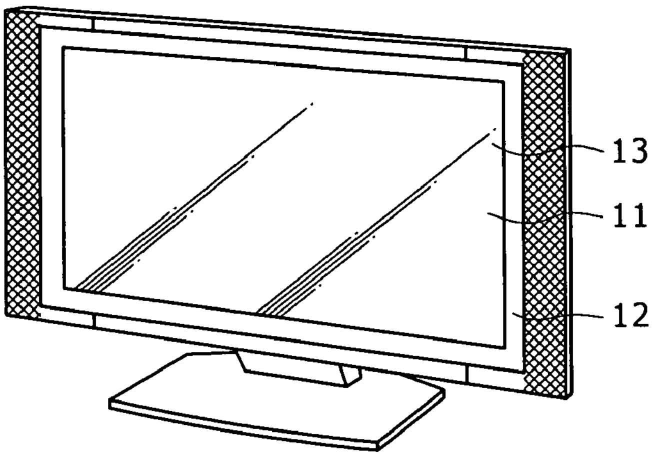
FIG. 18 is a perspective view showing a television set which includes the display apparatus of FIG. 13.

FIG. 18 shows a television set to which the embodiments of the present invention is applied. Referring to FIG. 18, the television set includes a front panel 12, an image display screen 11 formed from a filter glass plate 3 and so forth and is produced using the display apparatus of the embodiments of the present invention as the image display screen 11.

Figure 19:
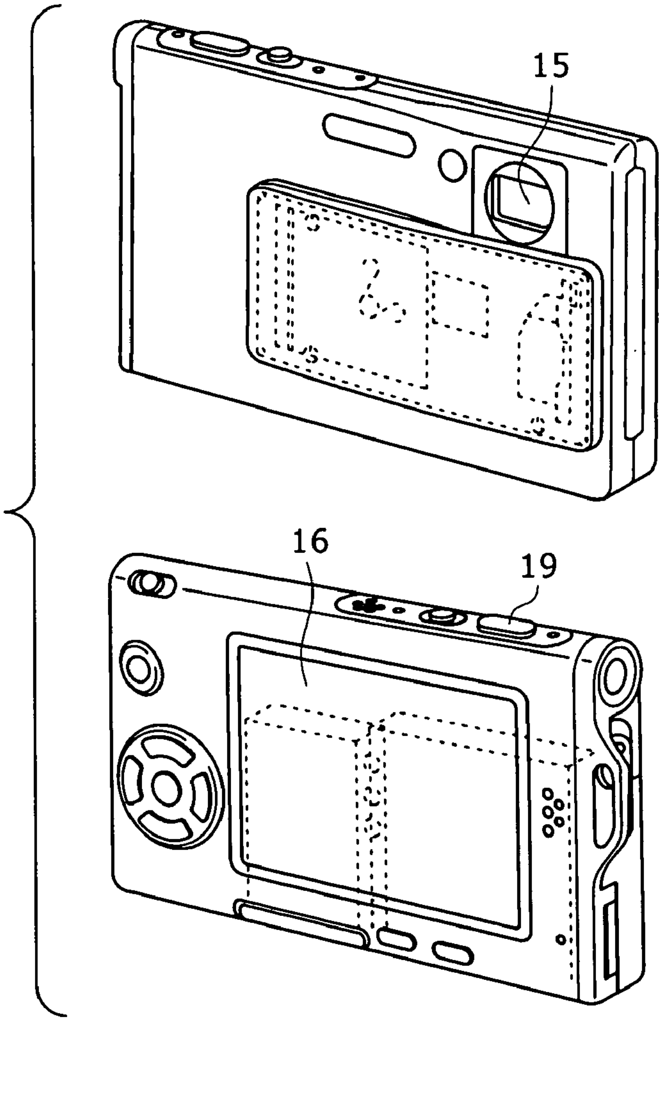
FIG. 19 is perspective views showing a digital still camera which includes the display apparatus of FIG. 13.

FIG. 19 shows a digital camera to which the embodiments of the present invention are applied. Referring to FIG. 19, a front elevational view of the digital camera is shown on the upper side, and a rear elevational view of the digital camera is shown on the lower side. The digital camera shown includes an image pickup lens, a flash light emitting section 15, a display section 16, a control switch, a menu switch, a shutter 19 and so forth. The digital camera is produced using the display apparatus of the embodiments of the present invention as the display section 16.

Figure 20:
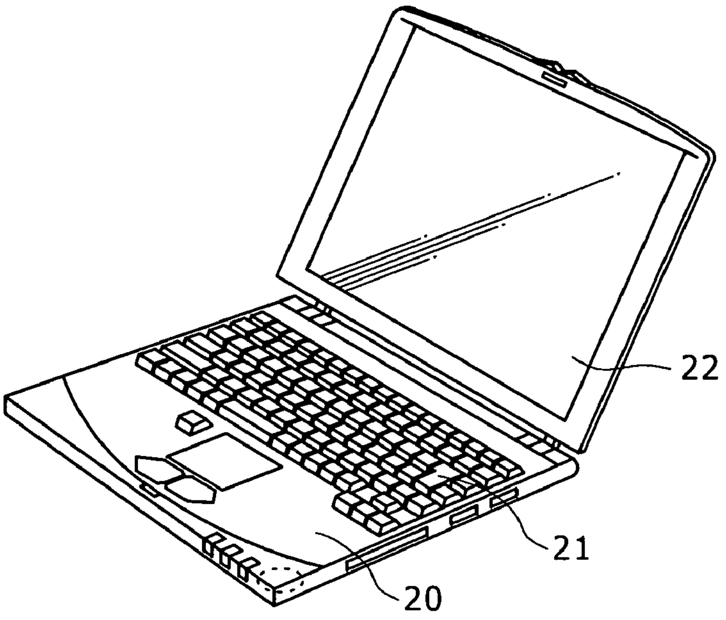
FIG. 20 is a perspective view showing a notebook type personal computer which includes the display apparatus of FIG. 13.

FIG. 20 shows a notebook type personal computer to which the embodiments of the present invention are applied. Referring to FIG. 20, the notebook type personal computer shown includes a body 20, a keyboard 21 for being operated in order to input characters and so forth, a display section 22 provided on a body cover for displaying an image and so forth. The notebook type personal computer is produced using the display apparatus of the embodiments of the present invention as the display section 22.

Figure 21:
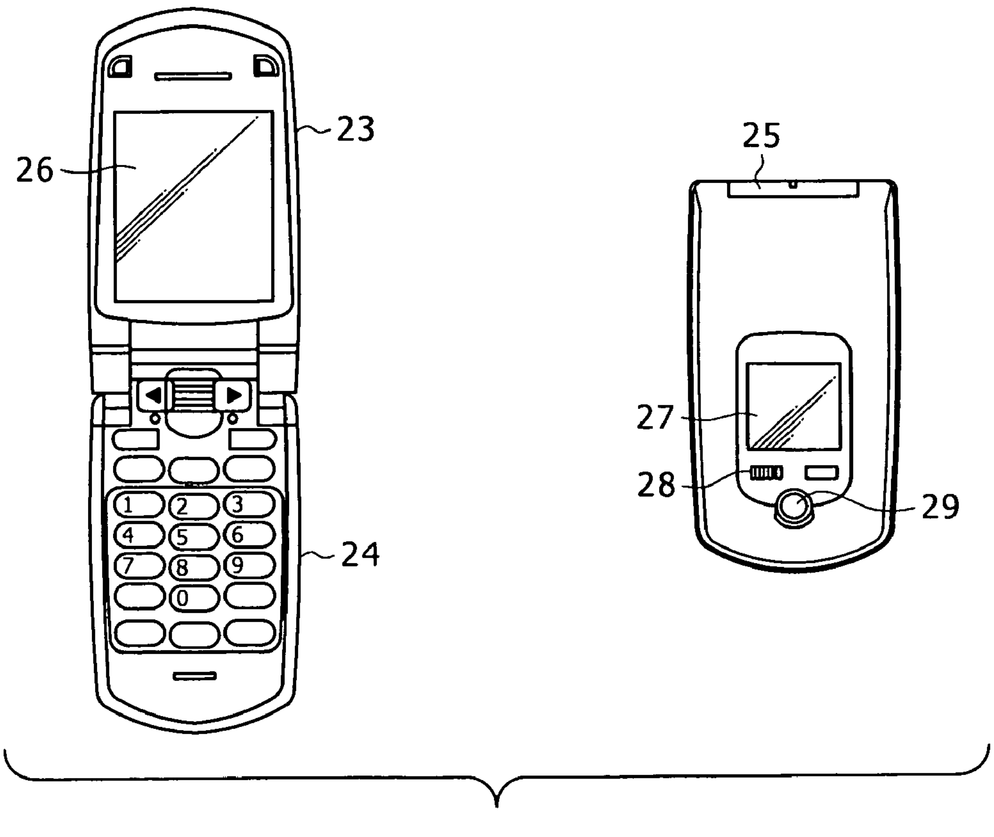
FIG. 21 is schematic views showing a portable terminal apparatus which includes the display apparatus of FIG. 13.

FIG. 21 shows a portable terminal apparatus to which the embodiments of the present invention are applied. Referring to FIG. 21, the portable terminal apparatus is shown in an unfolded state on the left side and shown in a folded state on the right side. The portable terminal apparatus includes an upper side housing 23, a lower side housing 24, a connection section 25 in the form of a hinge section, a display section 26, a sub display section 27, a picture light 28, a camera 29 and so forth. The portable terminal apparatus is produced using the display apparatus of the embodiments of the present invention as the display section 26 and the sub display section 27.

Figure 22:
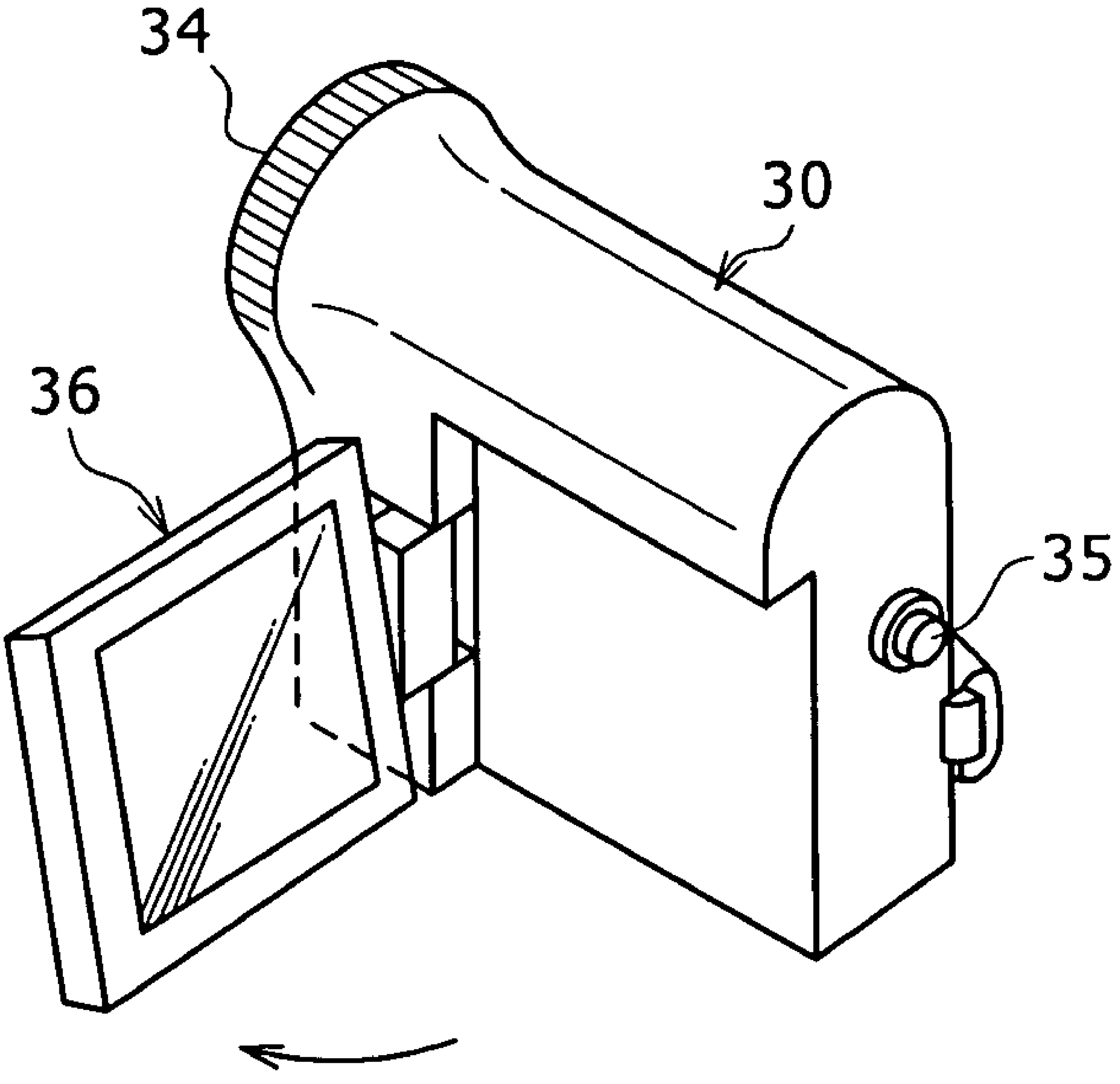
FIG. 22 is a perspective view showing a video camera which includes the display apparatus of FIG. 13.
Figure 23:
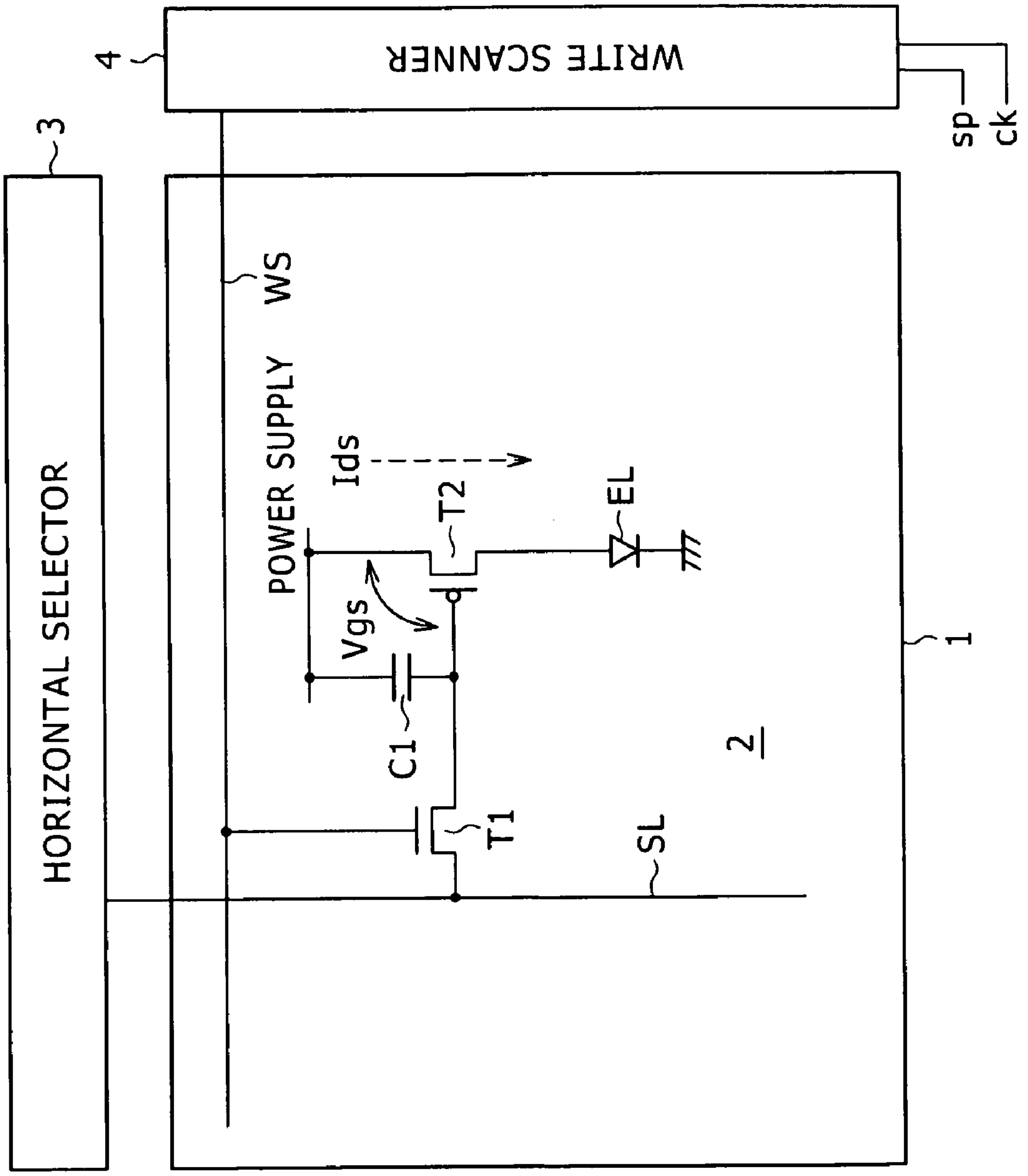
FIG. 23 is a circuit diagram showing an example of an existing display apparatus.
Figure 24:
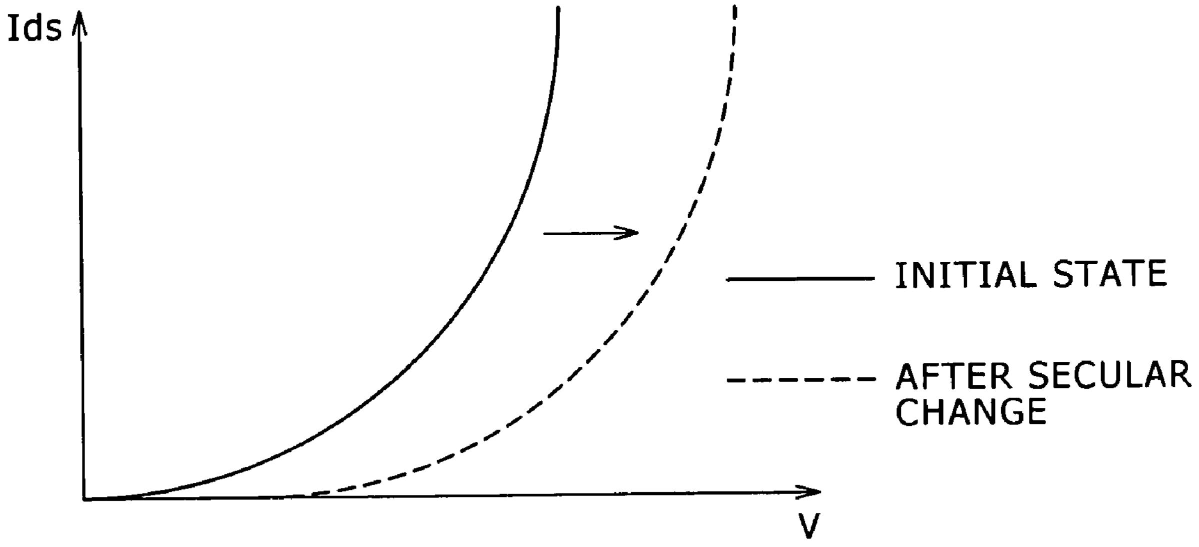
FIG. 24 is a graph illustrating a problem of the existing display apparatus of FIG. 23.
Figure 25:
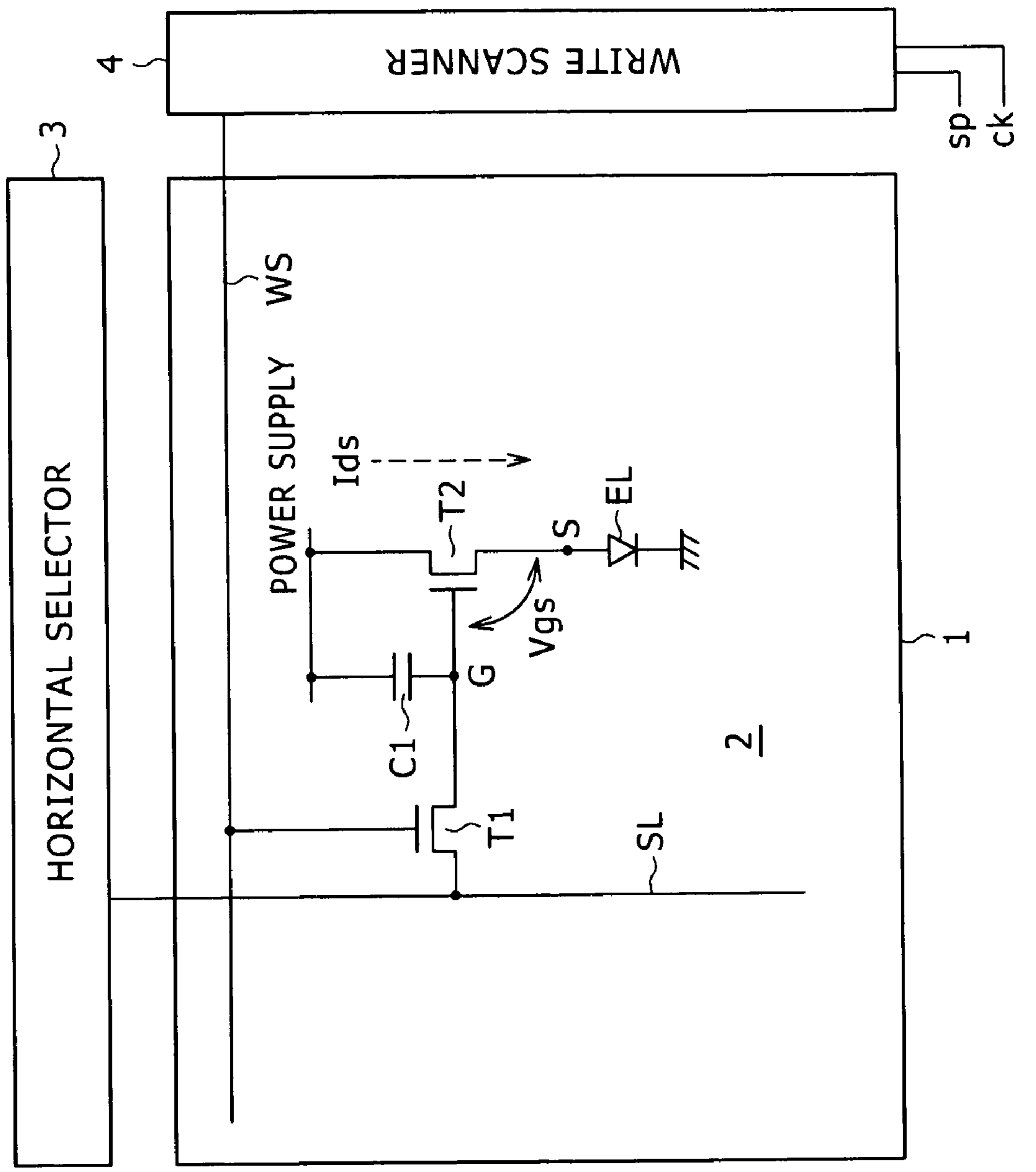
FIG. 25 is a circuit diagram showing another example of an existing display apparatus.

FIG. 22 shows a video camera to which the embodiments of the present invention are applied. Referring to FIG. 22, the video camera shown includes a body section 30, and a lens 34 for picking up an image of an image pickup object, a start/stop switch 35 for image pickup, a monitor 36 and so forth provided on a face of the body section 30 which is directed forwardly. The video camera is produced using the display apparatus of the embodiments of the present invention as the monitor 36.

It should be understood by those skilled in the art that various modifications, combinations, sub-combinations and alterations may occur depending on design requirements and other factor in so far as they are within the scope of the appended claims or the equivalents thereof.

What is claimed is:

1. A display apparatus, comprising:

a pixel array section; and a driving section;

said pixel array section including a plurality of scanning lines extending along the direction of a row, a plurality of signal lines extending along the direction of a column, a plurality of pixels disposed in rows and columns at places at which said scanning lines and said signal lines intersect with each other, and a plurality of feed lines disposed in parallel to said scanning lines, said driving section including a signal selector for supplying a driving signal having a signal potential to said signal lines, a write scanner for successively supplying a control signal to said scanning lines, and a drive scanner for supplying a power supply, which changes over between a high potential and a low potential, to said feed lines, each of said pixels including a sampling transistor connected at one of a pair of current terminals thereof to an associated one of said signal lines and at a control terminal thereof to an associated one of said scanning lines, a driving transistor connected at one of a pair of current terminals thereof, which serves as a drain side, to an associated one of said feed lines and at a control terminal thereof, which serves as a gate, to the other one of the current terminals of said sampling transistor, a light emitting element connected to that one of the current terminals of said driving transistor which serves as a source side, and a storage capacitor connected between the source and the gate of said driving transistor, said write scanner supplying the control signal to said scan lines while successively displacing the phase of the control signal, said drive scanner dividing said feed lines into groups of a predetermined number of feed lines such that said drive scanner carries out changeover between a high potential and a low potential while the phase is successively displaced in a unit of a group whereas said drive scanner changes over the potential of the feed lines in each of the groups in the same phase, wherein said signal selector supplies the driving signal which alternately changes over at least between a reference potential and a signal potential, and said sampling transistor is turned on, when the associated signal line has the reference potential and the associated feed line has the low potential, in response to the control signal to carry out a preparation operation of setting the gate-source voltage of said driving transistor to a voltage higher than a threshold voltage of said driving transistor, and then is turned on, when the associated signal line has the reference potential and the associated feed line has the high potential, in response to the control signal to carry out a correction operation of discharging said storage capacitor so that the gate-source voltage of said driving transistor becomes equal to the threshold voltage, whereafter said sampling transistor is turned on, when the associated signal line has the signal potential and the associated feed line has the high potential, in response to the control signal to carry out a writing operation of storing the signal potential into said storage capacitor.

2. The display apparatus according to claim 1, wherein said signal selector supplies the driving signal, which varies among three levels including a storage potential lower than the reference potential in addition to the reference potential and the signal potential, to said signal lines, and said sampling transistor applies the storage potential to the gate of said driving transistor at a final stage of the preparation operation to place said driving transistor once into an off state.

3. The display apparatus according to claim 2, wherein said sampling transistor repeats the correction operation time-divisionally by a plural number of times and applies the storage potential in at least one of the correction operations to the gate of said driving transistor.

4. The display apparatus according to claim 1, wherein the preparation operation is carried out all at once for those of said pixels which are included in the rows which belong to one group, and the correction operation is carried out in a displaced relationship in a unit of a row.

5. The display apparatus according to claim 1, wherein the preparation operation and the correction operation are carried out successively in a displaced relationship in a unit of a row.

6. A display apparatus, comprising:

a pixel array section; and a driving section;

said pixel array section including a plurality of scanning lines extending along the direction of a row, a plurality of signal lines extending along the direction of a column, a plurality of pixels disposed in rows and columns at places at which said scanning lines and said signal lines intersect with each other, and a plurality of feed lines disposed in parallel to said scanning lines, said driving section including a signal selector for supplying a driving signal having a signal potential to said signal lines, a write scanner for successively supplying a control signal to said scanning lines, and a drive scanner for supplying a power supply, which changes over between a high potential and a low potential, to said feed lines, each of said pixels including a sampling transistor connected at one of a pair of current terminals thereof to an associated one of said signal lines and at a control terminal thereof to an associated one of said scanning lines, a driving transistor connected at one of a pair of current terminals thereof, which serves as a drain side, to an associated one of said feed lines and at a control terminal thereof, which serves as a gate, to the other one of the current terminals of said sampling transistor, a light emitting element connected to that one of the current terminals of said driving transistor which serves as a source side, and a storage capacitor connected between the source and the gate of said driving transistor, said write scanner supplying the control signal to said scan lines while successively displacing the phase of the control signal, said drive scanner dividing said feed lines into groups of a predetermined number of feed lines such that said drive scanner carries out changeover between a high potential and a low potential while the phase is successively displaced in a unit of a group whereas said drive scanner changes over the potential of the feed lines in each of the groups in the same phase, wherein said sampling transistor is turned on, when said light emitting element is in a light emitting state with current supplied thereto from said driving transistor and the associated signal line is at a reference potential, in response to the control signal to write the reference potential to the gate of said driving transistor to turn off said driving transistor thereby to change over the state of said light emitting element from the light emitting state to a non-light emitting state.

7. The display apparatus according to claim 6, wherein said light emitting element is connected at the anode thereof to the source of said driving transistor and at the cathode thereof to a predetermined cathode potential, and the reference potential is lower than the sum of the threshold voltage of said light emitting element and the threshold voltage of said driving transistor to the cathode potential.

8. An electronic apparatus comprising the display apparatus of claim 6.

9. A display apparatus, comprising:

a pixel array section; and a driving section, said pixel array section including a plurality of scanning lines extending along the direction of a row, a plurality of signal lines extending along the direction of a column, a plurality of pixels disposed in rows and columns at intersections of the scanning lines and signal lines, and a plurality of feed lines disposed in parallel to the scanning lines, said driving section including a signal selector for supplying an input signal having a signal potential to said signal lines, a write scanner for supplying a control signal to said scanning lines, and a drive scanner for supplying a power supply potential to said feed lines, each of said pixels including a sampling transistor connected at a first current terminal thereof to an associated one of the signal lines and at a control terminal thereof to an associated one of the scanning lines, a driving transistor connected at a first current terminal thereof to an associated one of the feed lines and at a control terminal thereof to a second current terminal of the sampling transistor, a light emitting element connected to a second current terminal of the driving transistor, and a storage capacitor connected between the second current terminal and the control terminal of said driving transistor, said write scanner successively displacing a phase of the control signal for each of a plurality of scanning lines, and said drive scanner dividing said feed lines into groups comprising a plurality of feed lines such that said drive scanner concurrently places the plurality of feed lines for a group at the power supply potential while the phase is successively displaced for each of the plurality of scanning lines corresponding to the group, wherein the sampling transistor is turned on, when the light emitting element is in a light emitting state with current supplied thereto from said driving transistor and the associated signal line is at a reference potential, in response to the control signal, causing the reference potential to be applied to the control terminal of the driving transistor to turn off the driving transistor, thereby changing over the state of the light emitting element from the light emitting state to a non-light emitting state.

10. An electronic apparatus comprising the display apparatus of claim 9.

11. A driving method for a display apparatus comprising a pixel array section; and a driving section, said pixel array section including a plurality of scanning lines extending along the direction of a row, a plurality of signal lines extending along the direction of a column, a plurality of pixels disposed in rows and columns at intersections of the scanning lines and signal lines, and a plurality of feed lines disposed in parallel to the scanning lines, said driving section including a signal selector for supplying an input signal having a signal potential to said signal lines, a write scanner for supplying a control signal to said scanning lines, and a drive scanner for supplying a power supply potential to said feed lines, each of said pixels including a sampling transistor connected at a first current terminal thereof to an associated one of the signal lines and at a control terminal thereof to an associated one of the scanning lines, a driving transistor connected at a first current terminal thereof to an associated one of the feed lines and at a control terminal thereof to a second current terminal of the sampling transistor, a light emitting element connected to a second current terminal of the driving transistor, and a storage capacitor connected between the second current terminal and the control terminal of said driving transistor, the driving method comprising:

successively displacing, by the write scanner, a phase of the control signal for each of a plurality of scanning lines, and dividing, by said drive scanner, said feed lines into groups comprising a plurality of feed lines such that said drive scanner concurrently places the plurality of feed lines for a group at the power supply potential while the phase is successively displaced for each of the plurality of scanning lines corresponding to the group, wherein the sampling transistor is turned on, when the light emitting element is in a light emitting state with current supplied thereto from said driving transistor and the associated signal line is at a reference potential, in response to the control signal, causing the reference potential to be applied to the control terminal of the driving transistor to turn off the driving transistor, thereby changing over the state of the light emitting element from the light emitting state to a non-light emitting state.

* * * * *